(12) United States Patent
Ono et al.

(10) Patent No.: US 6,568,831 B2
(45) Date of Patent: May 27, 2003

(54) FLUORESCENT TUBE WITH CABLE, SURFACE ILLUMINATING DEVICE AND METHOD OF MANUFACTURING SAME, AND LIQUID CRYSTAL DISPLAY

(75) Inventors: Shin-Ichirou Ono, Tokyo (JP); Hirokazu Fukuyoshi, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 09/999,472

(22) Filed: Oct. 31, 2001

(65) Prior Publication Data

US 2003/0081414 A1 May 1, 2003

(30) Foreign Application Priority Data

Oct. 31, 2000 (JP) ........................................ 2000-333819

(51) Int. Cl.[7] ................................................ F21V 23/02
(52) U.S. Cl. ...................... 362/221; 362/296; 362/341; 362/217; 349/70
(58) Field of Search .................. 362/221, 222, 362/217, 296, 341; 349/70; 439/226

(56) References Cited

U.S. PATENT DOCUMENTS

| 2,495,252 A | * | 1/1950 | Hansen, Sr. et al. .... 174/153 R |
| 4,312,028 A | * | 1/1982 | Hamacher ................... 362/369 |
| 4,664,481 A | * | 5/1987 | Ito et al. ........................ 349/62 |
| 4,842,535 A | * | 6/1989 | Velke, Sr. et al. ........... 439/232 |
| 4,924,368 A | * | 5/1990 | Northrop et al. ............ 362/376 |
| 5,147,127 A | * | 9/1992 | Honda et al. ................... 362/23 |
| 5,856,777 A | * | 1/1999 | Rullman et al. ............. 340/426 |
| 5,975,722 A | * | 11/1999 | Van Duijneveldt .......... 362/296 |
| 6,325,651 B1 | * | 12/2001 | Nishihara et al. ............ 439/232 |

FOREIGN PATENT DOCUMENTS

| JP | 7-281160 | 10/1995 |
| JP | 7-281161 | 10/1995 |

* cited by examiner

*Primary Examiner*—Sandra O'Shea
*Assistant Examiner*—Ronald E. DelGizzi
(74) *Attorney, Agent, or Firm*—Katten Muchin Zavis Rosenman

(57) ABSTRACT

A method for attaching a cable to a fluorescent tube is provided which is capable of making narrow a width of a plaque edge portion by saving a redundant space in a connected portion in which a fluorescent tube is connected to cables, of improving reliability by enhancing mechanical strength at the connected portion and of reducing counts of components required to reinforce the connected portion and the number of processes necessary for assembly.

Each of a pair of cables for supplying power to the fluorescent tube is connected to each of ends of the fluorescent tube. The connected portion in which an end of the fluorescent tube is connected to the cable is molded with a resin to form a resin-molded portion. A holding member fabricated by an injection molding machine is attached to the connected portion. A reflector used to reflect light emitted from the fluorescent tube is integrally attached.

10 Claims, 27 Drawing Sheets

24;metal mold

24;metal mold

24;metal mold

25; surface mold

26; rear mold

71; personal digital assistant
73; display section
75; input device

FLUORESCENT TUBE WITH CABLE, SURFACE ILLUMINATING DEVICE AND METHOD OF MANUFACTURING SAME, AND LIQUID CRYSTAL DISPLAY

BACKGROUND OF THE INVENTION

1. Field of the Invention

The present invention relates to a method for attaching a cable for supplying power to a fluorescent tube, a method for manufacturing a surface illuminating device with the fluorescent tube, a fluorescent tube with cables, a surface illuminating device with the fluorescent tube and a liquid crystal display device having the surface illuminating device.

The present application claims priority of Japanese Patent Application No. 2000-333819 filed on Oct. 31, 2000.

2. Description of the Related Art

In recent years, in portable information devices such as notebook-type personal computers, it is required that they are made lightweight and thin. At the same time, as shown in FIG. 34, for example, in a notebook-type personal computer 101, an effort has been made to make a display area relatively large in size by making narrow, as much as possible, a width of a plaque edge portion 103 used to hold an edge portion of a liquid crystal display device 102 and being not contributing directly to a liquid crystal display.

Moreover, as shown in FIGS. 35 and 36, the liquid crystal display device 102 includes, for example, a transmissive-type TFT (Thin Film Transistor) liquid crystal panel 104, a backlight 105 used to apply illuminating light from its rear side and a front case 106 used as a holding frame to hold a main body of the liquid crystal display device 102. Here, the plaque edge portion 103 has to have a thickness of, for example, about 7 mm.

Moreover, the backlight 105, as shown in FIGS. 36 and 37, includes a fluorescent tube 108, a reflector 109 used to reflect light emitted from the fluorescent tube 108, a rear chassis 110 used as a holding frame on a rear side of the backlight 105, a light guiding plate 111 used to take in direct light from the fluorescent tube 108 or light reflected off the reflector 109 and to emit it as planar light, a reflecting sheet 112 disposed on the rear chassis 110 and used to reflect light emitted from the fluorescent tube 108 to a side of the light guiding plate 111, optical correction sheets 113, 113, ..., made up of a plurality of pieces of prism sheets, diffusion sheets, or a like used to highly accurately correct variations in luminance and to improve uniformity in luminance, and a lamp cover 114.

The fluorescent tube 108, for example, in the case of the fluorescent tube to be used for a 14-inch type liquid crystal display device, is so formed that it has a shape of a narrow tube with a diameter of about 2 mm and a length of about 190 mm and that its both ends are sealed so that its inside portion is filled with mercury gas and inert gas in a sealed manner and that a pair of electrodes is sealed at both ends of the long cylindrical-shaped glass tube and that an ultraviolet ray reflecting layer and a phosphor layer are formed in an inside face of the glass tube. To each of the electrodes is connected each of lead conductors 115a and 115b. A pair of cables 116a and 116b for supplying power is connected to the fluorescent tube 108. Each of holding rubber caps 117a and 117b used to hold the fluorescent tube 108 is connected to each of ends of the fluorescent tube 108. The cables 116a and 116b are drawn out from a cable drawing-port 110a formed in the rear chassis 110.

On a side being opposite to the cable drawing-port 110a, as shown in FIGS. 38 and 39, the cable 116a is connected in a direction being approximately perpendicular to the fluorescent tube 108. That is, as shown in FIG. 39, the lead conductor 115a connected to the fluorescent tube 108 is bent at right angles. After having soldered the lead conductor 115a to a core wire 118a of the cable 116a, an end on a side of the cable 116a is covered with a thermal shrinkage tube 119 and fixed. Then, the L-shaped holding rubber cap 117a is attached to ends of the cable 116a and the fluorescent tube 108 and fixed. To protect connected portions, the holding rubber cap 117a is covered with another thermal shrinkage tube 120. As a material for the holding rubber cap 117a, a comparatively flexible material that can be easily attached is selected.

The methods to protect such the connected portions as described above by using the holding rubber cap is disclosed in, for example, Japanese Patent Application Laid-open Nos. Hei 7-281160 and Hei 7-281161.

In the disclosed method, as shown in FIG. 37 and FIG. 40, when the fluorescent tube 108 is embedded in the backlight 105, in order to prevent the connected portion in which the fluorescent tube 108 is connected to the cable 116a being subjected to stresses, the cable 116a is hung on a bump projection piece 110b formed on the rear chassis 110 and is then routed around to form a margin portion 121 and is finally drawn out from the cable drawing-port 110a.

When the fluorescent tube 108 is embedded in the backlight 105, on a side being opposite to the cable drawing-port 110a of the cable 116a, for example, as shown in FIG. 41, a core wire 118b of the cable 116b is soldered, with a margin portion 122 formed by a tip portion of the core wire 118b being bent in a shape of a letter "U", to the lead conductor 115b of the fluorescent tube 108 to be connected to each other and then a holding rubber cap 117b is covered to protect the connected portion.

However, the above conventional method has problems. That is, in the case of the method, in particular, in which the cable 116a is attached to an axis of the fluorescent tube 108 at right angles, to obtain mechanical strength at the connected portion, as described above, the cable 116a is hung on the bump projection piece 110b formed on the rear chassis 110 and is then routed around to form the margin portion 121 and is finally drawn out from the cable drawing-port 110a. As a result, a width of the corresponding plaque edge portion 103 becomes large. This causes a lowered ratio of a front area of the backlight 105, serving as a region in which light is emitted when the fluorescent tube 108 is embedded in the backlight 105, to its all surface area and a lowered ratio of a front area of the liquid crystal display device 102, serving as a liquid crystal displaying region when the backlight 105 is embedded in the liquid crystal display device 102, to its all surface area. For example, if a diameter of the cable 116b is about 1.6 mm and a thickness of the bump projection piece 110b is about 1 mm, to route the cable 116a, redundant space of at least about 3 mm along an axial direction of the fluorescent tube 108 has to be expended.

Moreover, when the cable 116a is attached to the axis of the fluorescent tube 108 at right angles, the lead conductor 115a is also bent at right angles. The holding rubber cap 117a is made up of flexible and soft materials. These factors cause the mechanical strength in the connected portions to become lower. If, therefore, a stress is applied on the connected portions in which the fluorescent tube 108 is connected to the cable 116a, a failure such as breaking of wires or a like readily occurs. Since the thermal shrinkage tubes 119 and 120 are used at the connected portion in which the fluorescent tube 108 is connected to the cable 116a, component counts become high and many man-hours and much time are required in assembling process of the connected portion.

Furthermore, there is another problem. That is, when the holding rubber cap 117a is used to position the reflector 109 to the fluorescent tube 108, the holding rubber cap 117a is easily deformed, which makes it difficult to perform exact positioning of the reflector 109 to the fluorescent tube 108. Because of this, for example, the reflector 109 is attached to a place being deviated from its originally expected position. This causes direct light from the fluorescent tube 108 or light reflected off the reflector 109 to be emitted in an unwanted direction, which causes degradation in luminance characteristics of the backlight 105 and to a decrease in its reliability.

SUMMARY OF THE INVENTION

In view of the above, it is an object of the present invention to provide a method for attaching cable to a fluorescent tube, a method of manufacturing a surface illuminating device, a fluorescent tube with cables, a surface illuminating device and a liquid crystal display device, which are capable of making small a width of a plaque edge portion by saving redundant space at a connected portion in which the fluorescent tube is connected to the cable.

It is another object of the present invention to provide the method for attaching the cable to the fluorescent tube, method of manufacturing the surface illuminating device, fluorescent tube with cables, surface illuminating device, and liquid crystal display device, which are capable of making low component counts of holding members such as a cable clamp or a like used to reinforce the connected portion in which the fluorescent tube is connected to the cable, of reducing the number of processes required for assembling these components, of enhancing mechanical strength of the connected portion in which the fluorescent tube is connected to the cable, thereby improving their reliability.

It is still another object of the present invention to provide the method for manufacturing the surface illuminating device, the surface illuminating device and the liquid crystal display device, which are capable of performing exact positioning among the fluorescent tube with cables, reflector, and light guiding plate, thereby improving their reliability.

According to a first aspect of the present invention, there is provided a method for attaching a cable to a fluorescent tube in which the cable for supplying power is to be attached to the fluorescent tube being used as an illuminant for a liquid crystal display device and which has a glass tube and a pair of electrodes each of which is mounted and sealed in each end of the glass tube, the method including:

a step of electrically connecting a core wire of the cable to each of terminals being connected to the electrodes and being exposed outside the glass tube; and a step of housing a connected portion in which at least one of the terminals is connected to the core wire of the cable in a hollow of a mold having a hollow inside the mold and then injecting a resin into the hollow and having the resin hardened in the hollow and molding the connected portion to cover with a molded resin.

In the foregoing, a preferable mode is one wherein the step of the molding includes a step of housing at least one end portion of the glass tube and an end of an insulated portion of the cable on a side of the connected portion as well as the core wire in the hollow of the mold and then injecting, the resin into the hollow and having the resin hardened to cover with the molded resin.

Also, a preferable mode is one wherein, as the resin to be used, a material having heat resistance and electrical insulation is employed.

According to a second aspect of the present invention, there is provided a method for manufacturing a surface illuminating device which is used as an illuminating device for a liquid crystal display device having a fluorescent tube made up of a glass tube and a pair of electrodes each of which is mounted and sealed in each end of the glass tube, a reflector used to reflect light emitted from the fluorescent tube and a light guiding section used to guide direct light from the fluorescent tube or light reflected off the reflector in a direction approximately perpendicular to a light emitting face of the surface illuminating device, the method including:

a step of electrically connecting a core wire of a cable for supplying power to the fluorescent tube to each of terminals being exposed outside the glass tube being connected to the electrodes of the fluorescent tube;

a step of housing a connected portion in which at least one of the terminals is connected to the core wire of the cable in a hollow of a mold in which a convex-shaped portion or a concave-shaped portion is formed and then injecting a resin in the hollow and having the resin hardened in the hollow to cover the connected portion with a molded resin and, at the same time, of forming a concave-shaped portion or convex-shaped portion corresponding to the concave-shaped portion or convex-shaped portion and functioning as first and second positioning portions at predetermined places on the molded resin;

a step of attaching a reflector by having an end of the reflector come into contact with the first positioning portion, with the reflector being positioned to the fluorescent tube; and a step of attaching a light guiding section by having an angled portion come into contact with the second positioning portion, with the light guiding section being positioned to the fluorescent tube.

According to a third aspect of the present invention, there is provided a fluorescent tube with cables to be used as an illuminant for a liquid crystal display device, including:

a glass tube;

a pair of electrodes each of which is mounted and sealed in each end of the glass tube;

a pair of terminals each being connected to each of the electrodes and being exposed outside the glass tube;

the cables for supplying power; and wherein a core wire of the cable is electrically connected to each of the terminals and at least one connected portion is sealed with a hardened insulating resin thereat.

In the foregoing, a preferable mode is one wherein a resin-molded portion is formed by covering at least one end portion of the glass tube and an end of an insulated portion of the cable on a side of the connected portion as well as the core wire with a molded resin.

Also, a preferable mode is one wherein the resin-molded portion includes a first positioning portion with which an end of a reflector used to reflect light emitted from the fluorescent tube is put in contact for positioning when the reflector is attached to the fluorescent tube with the cables and a second positioning portion with which an angled portion of a light guiding section used to guide light emitted from the fluorescent tube to a predetermined direction is put in contact for positioning when the light guiding section is attached to the fluorescent tube with the cables.

Also, a preferable mode is one wherein the first positioning portion has a first step portion with which an end of the reflector is put in contact for positioning in a struck manner when the reflector is attached to the fluorescent tube with the cables and a second step portion with which an angled portion of a light guiding section is put in contact for positioning in a struck manner when the light guiding section is attached to the fluorescent tube with the cables.

According to a fourth aspect of the present invention, there is provided a surface illuminating device to be used as an illuminating device for a liquid crystal device including:

a fluorescent tube with cables to be used as an illuminant, having: a glass tube, a pair of electrodes each of which is sealed in each of ends of the glass tube, a pair of terminals each being connected to each of the electrodes and being exposed outside the glass tube, and the cables for supplying power; and wherein a core wire of the cable is electrically connected to each of the terminals and at least one connected portion is sealed with a hardened insulating resin thereat;

a reflector used to reflect light emitted from the fluorescent tube; and a light guiding section used to guide direct light from the fluorescent tube or light reflected off the reflector to a direction approximately perpendicular to a light emitting face of the surface illuminating device.

According to a fifth aspect of the present invention, there is provided a liquid crystal display device including:

a surface illuminating device described above; and a liquid crystal panel.

With the above configurations, when the connected portion in which the fluorescent tube is connected to the cable is molded with the resin, a large thickness of the connected portion is not necessary if the thickness is large enough to maintain a predetermined mechanical strength of the connected portion. Moreover, routing of cables is not necessary. A cable clamp is not required. Space is not required redundantly at the connected portion. Therefore, it is possible to make narrower a plaque edge portion of the surface illuminating device and/or the liquid crystal display device using the fluorescent tube with the cables of the present invention.

Moreover, in the connected portion in which the fluorescent tube is connected to the cable, after the terminal of the fluorescent tube has been electrically connected to the core wire of the cable, the connected portion is molded with the resin and therefore the mechanical strength of the connected portion can be enhanced and the reliability can be improved.

Also, a thermal shrinkage tube, cable clamp or alike are not required in the connected portion and therefore it is possible to reduce counts of components and man-hours for assembly.

Also, work required to bend and route the cables for assembly is not necessary and therefore easiness of the assembly can be improved and replacement of the fluorescent tube can be made easily and within a short time.

Furthermore, the first and second positioning portions are formed in the resin-molded portion and therefore the exact and reliable positioning of the fluorescent tube with cables to the reflector or to the light guiding plate is made possible and yield is enhanced as a result.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
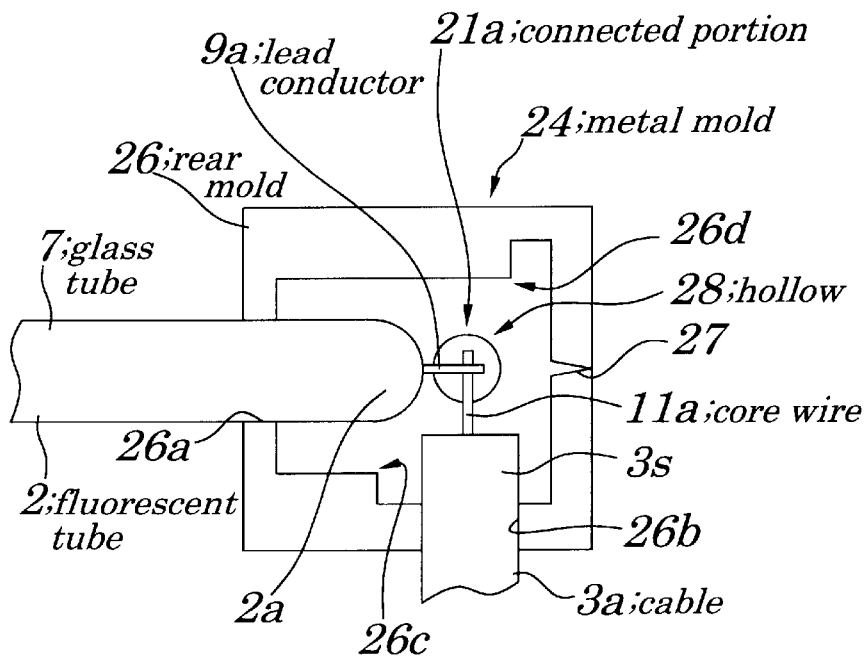
FIG. 1 is a diagram explaining a method for attaching a cable to a fluorescent tube according to a first embodiment of the present invention.
Figure 2:
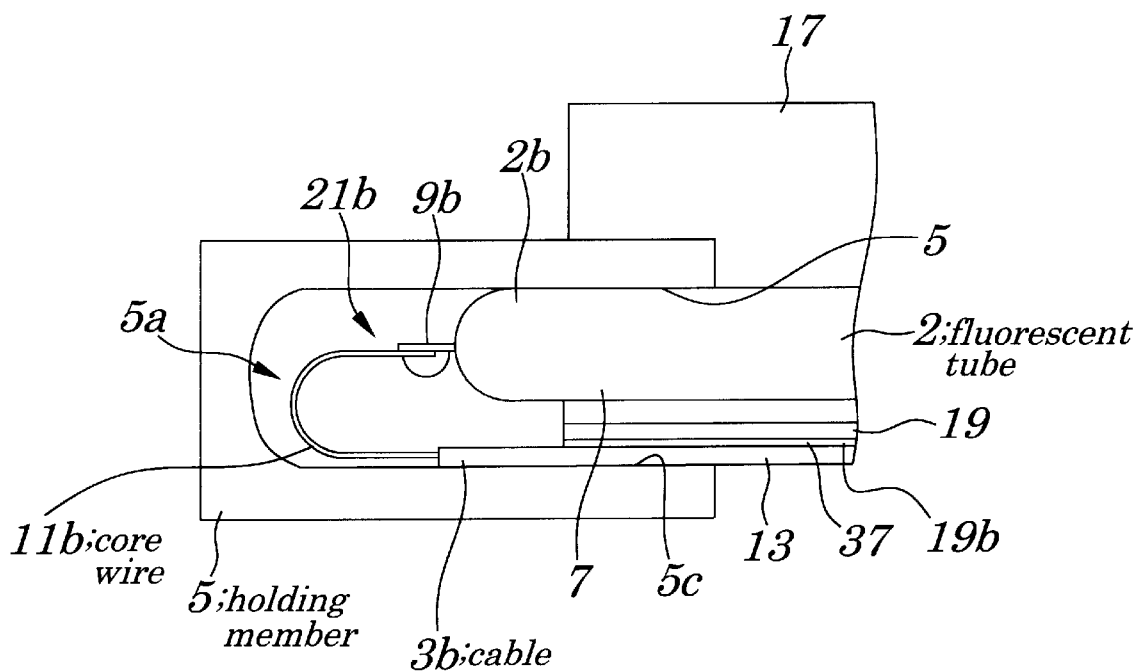
FIG. 2 is also a diagram explaining the method for attaching the cable to the fluorescent tube according to the first embodiment of the present invention.

First, a method for attaching a cable to a fluorescent tube of the first embodiment will be described. FIGS. 1 and 2 are diagrams explaining the method for attaching the cable to the fluorescent tube according to the first embodiment of the present invention.

As shown in FIGS. 1 and 2, in the method for attaching cables $3a$ and $3b$ to a fluorescent tube 2, a core wire $11a$ of the cable $3a$ is connected to a lead conductor (terminal) $9a$ being exposed outside a glass tube 7 of the fluorescent tube 2 and is then fixed and a core wire $11b$ of the cable $3b$ is connected to a lead conductor (terminal) $9b$ being exposed outside the fluorescent tube 2 and is then fixed and, after at least one connected portion $21a$ has been housed in a hollow 28 existing inside a metal mold 24, a resin is injected into the hollow 28 and is hardened to seal the connected portion $21a$ with the resin.

Figure 23:
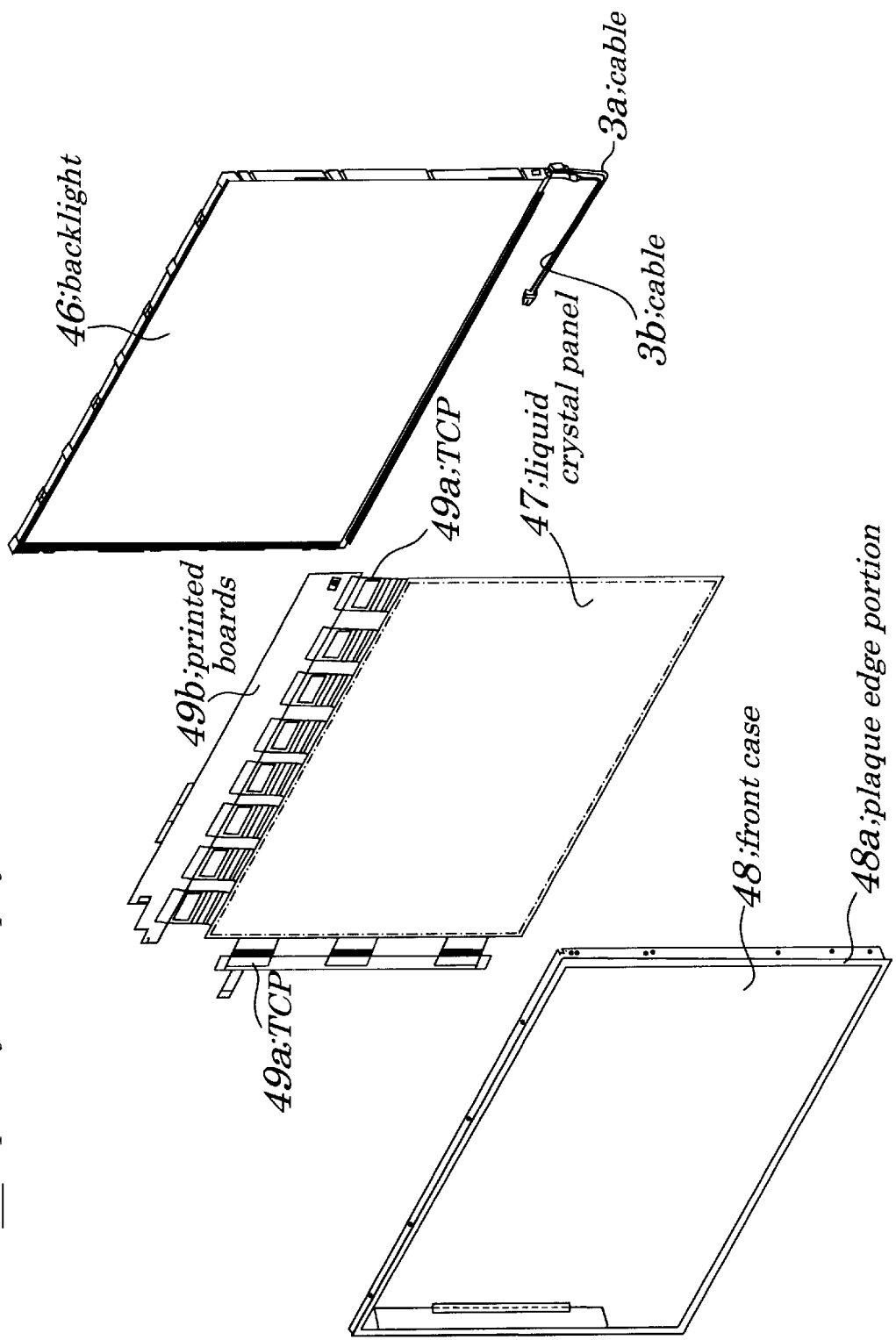
FIG. 23 is an exploded perspective view showing configurations of a liquid crystal display device using the backlight according to the example of the present invention.
Figure 24:
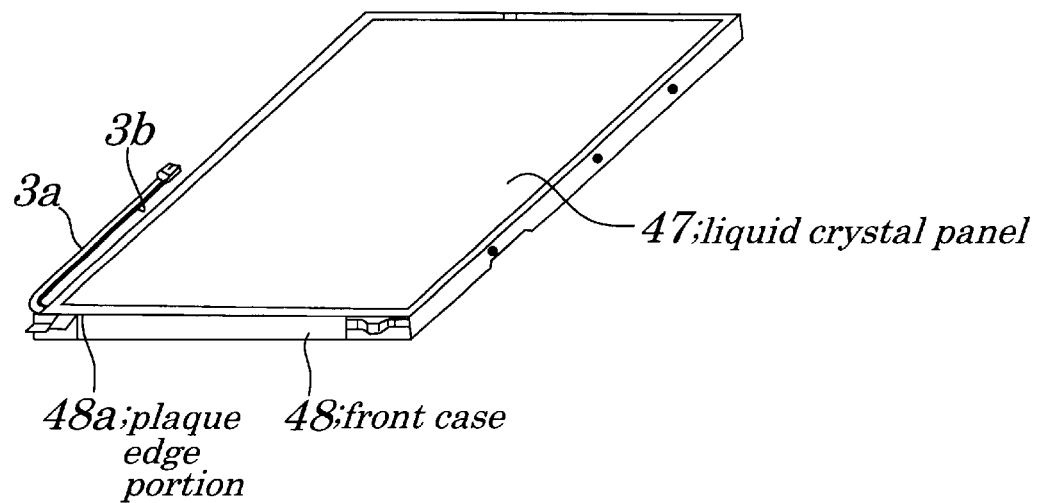
FIG. 24 is a perspective view of the liquid crystal display device of FIG. 23.

Thus, according to the first embodiment, the space is not required redundantly at the connected portion $21a$ and therefore, in a surface illuminating device and/or a liquid crystal display device using the fluorescent tube 2 with the cables $3a$, $3b$ which is prepared by using the method for attaching the cable $3a$, $3b$ to the fluorescent tube 2 of the first embodiment of the present invention, it is possible to make small a width of a plaque edge portion (refer to FIGS. 23 and 24).

Moreover, according to the first embodiment, at the connected portion $21a$ in which where the cable $3a$ is connected to the fluorescent tube 2, after the lead conductor $9a$ of the fluorescent tube 2 has been electrically connected to the core wire $11a$ of the cable $3b$, the connected portion $21a$ is molded with the resin. As a result, mechanical strength of the connected portion $21a$ is enhanced and reliability of a connection between the fluorescent tube 2 and the cable $3a$ can be improved.

Second Embodiment

Figure 3:
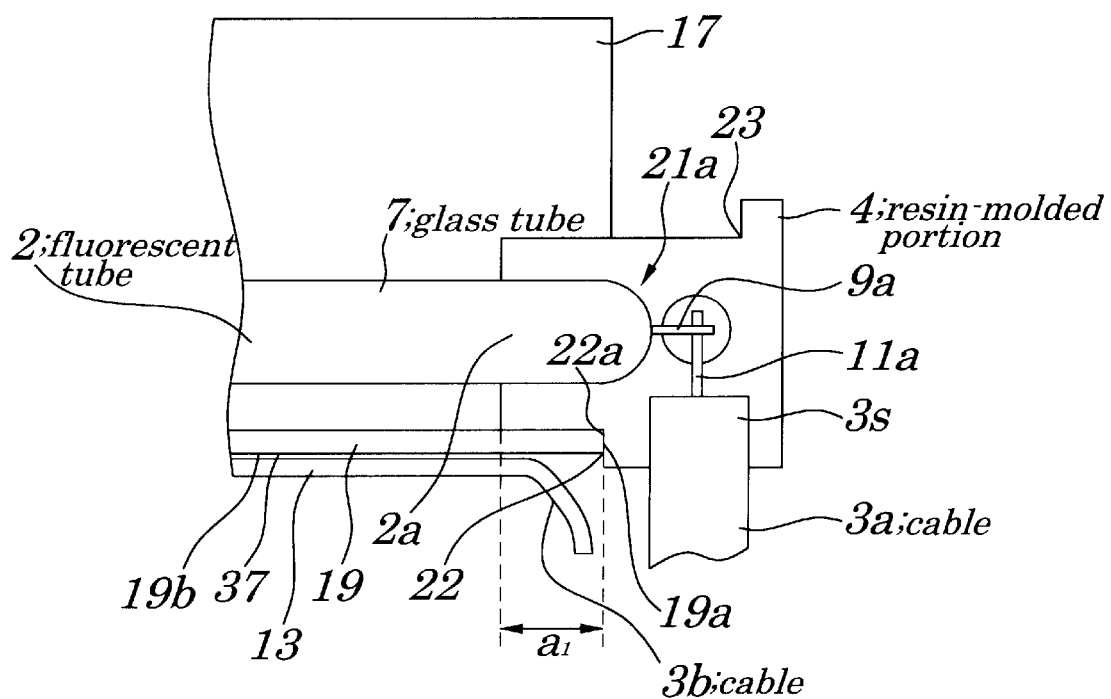
FIG. 3 is a diagram explaining a method for attaching a cable to a fluorescent tube employed in a second embodiment of the present invention.
Figure 4:
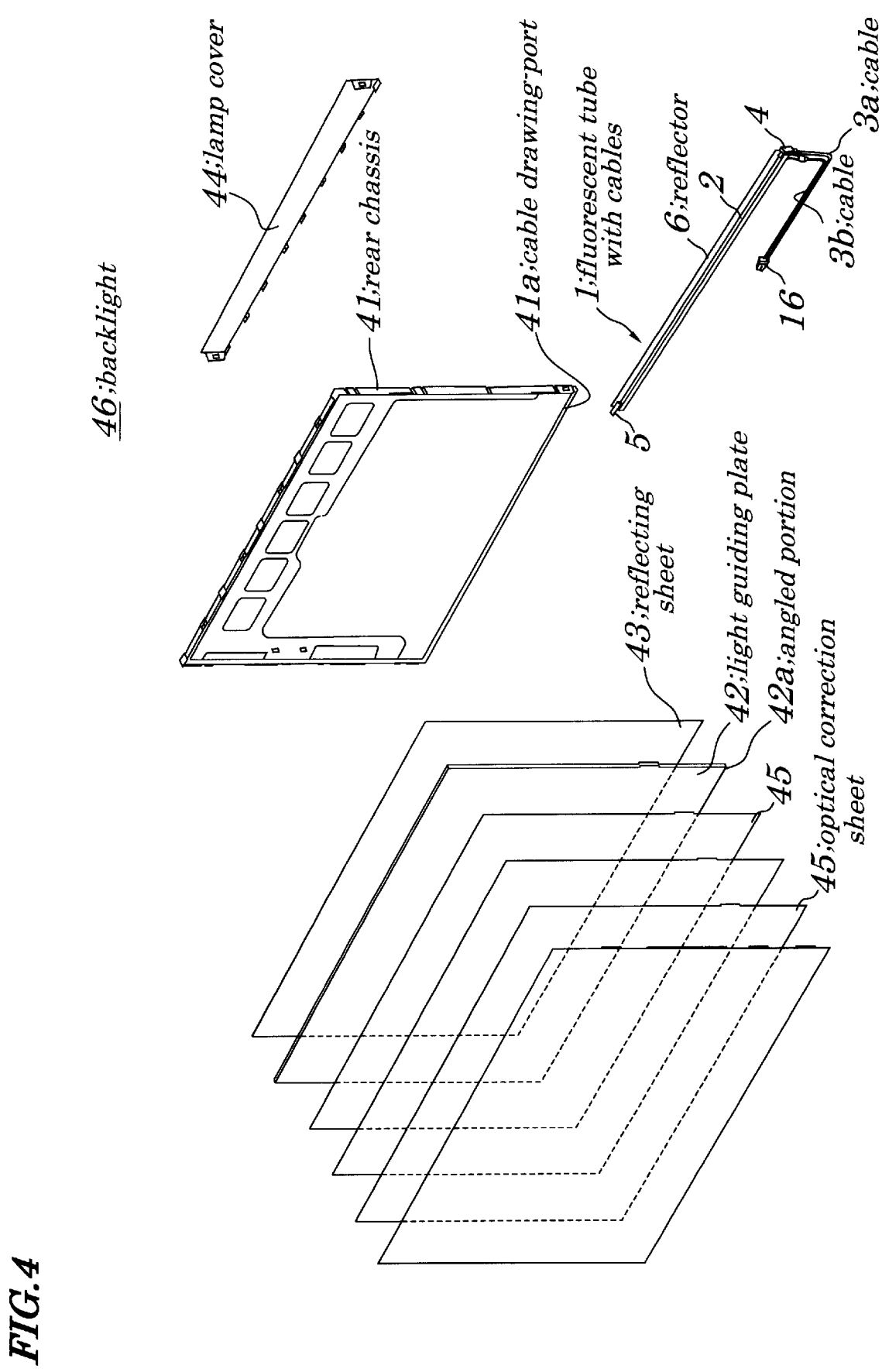
FIG. 4 is an exploded perspective view showing configurations of a backlight according to the second embodiment.

A method for manufacturing a backlight of a second embodiment of the present invention will be described. FIG. 3 is a diagram explaining a method for attaching a cable to a fluorescent tube employed in the second embodiment of the present invention. FIG. 4 is an exploded perspective view showing components of the backlight of the second embodiment. As shown in FIGS. 1, 3, and 4, in the method of manufacturing a backlight 46, a metal mold 24 is prepared in advance which has a hollow 28 in which two bump and dip portions one corresponding to a first positioning portion 22 used to position a reflector 6 to the fluorescent tube 2 and the other corresponding to a second positioning portion 23 used to position a light guiding plate 42 to the fluorescent tube 2 are formed.

Next, as shown in FIGS. 2, 3, and 4, a core wire $11a$ of a cable $3a$ is connected to a lead conductor $9a$ being exposed outside a glass tube 7 of the fluorescent tube 2 and a core wire $11b$ of a cable $3b$ is connected to a lead conductor $9b$ being exposed outside the glass tube 7 of the fluorescent tube 2. Then, after at least one connected portion $21a$ has been housed in the hollow 28 in the metal mold 24, a resin is injected into the hollow 28 and is hardened to seal the connected portion $21a$ with the resin and, at the same time, the first and second positioning portions 22 and 23 are formed. Next, an end of the reflector 6 is put on the first positioning portion 22 in an adjusted manner so that the reflector 6 is properly attached to the fluorescent tube 2 in a positioned state while a corner part of the light guiding plate 42 (light guiding section) is put on the second positioning portion 23 in an adjusted manner so that the light guiding plate 42 is properly attached to the fluorescent tube 2 in a positioned state.

Thus, according to the second embodiments exact and reliable positioning of the reflector 6 and/or the light guiding plate 42 to the fluorescent tube 2 can be implemented and yield can be enhanced accordingly.

Third Embodiment

Figure 5:
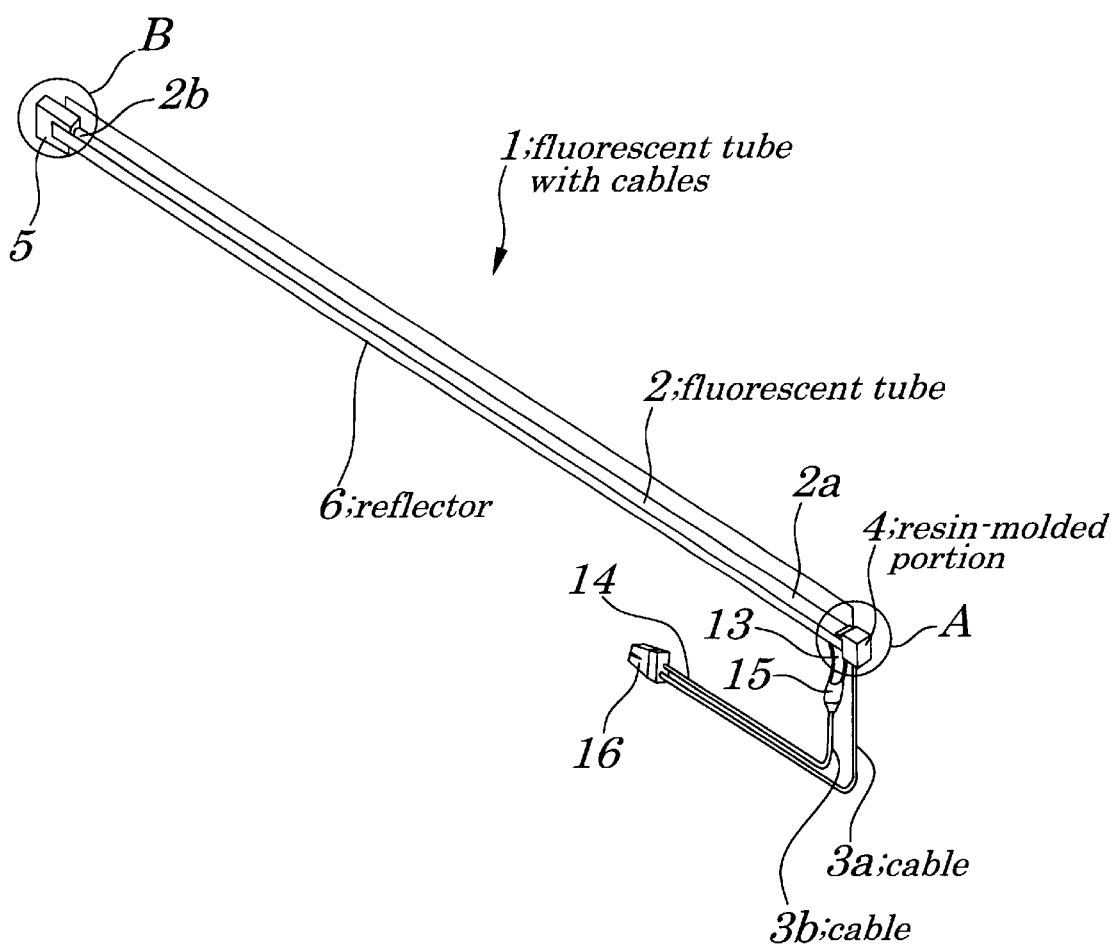
FIG. 5 is a perspective view showing configurations of a fluorescent tube with cables according to a third-embodiment of the present invention.
Figure 6:
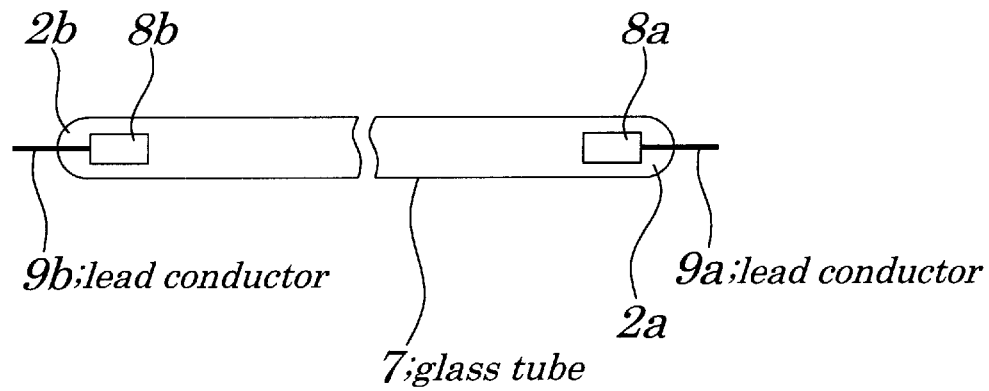
FIG. 6 is a cross-sectional view showing configurations of a fluorescent tube according to an example of the present invention.
Figure 7:
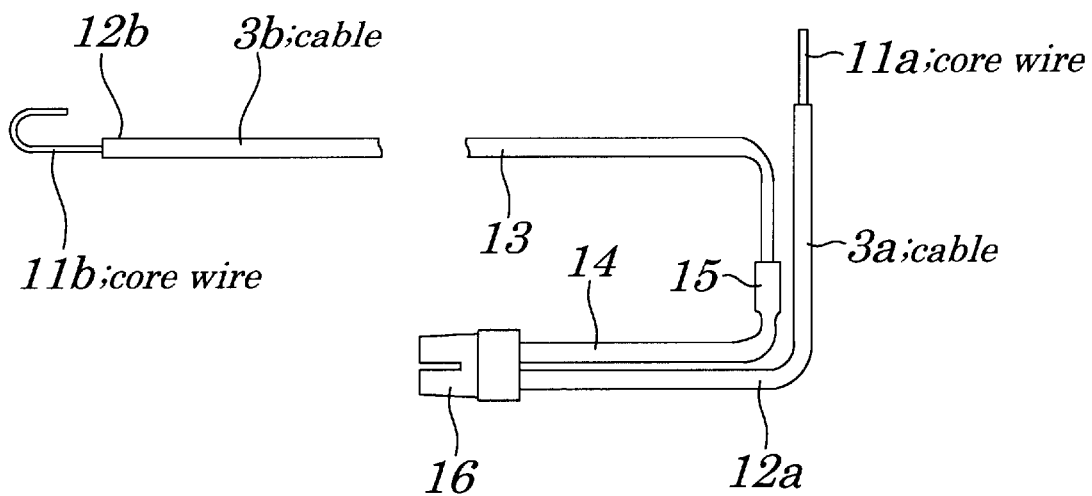
FIG. 7 is a diagram illustrating cables to be connected to the fluorescent tube of FIG. 6.

A fluorescent tube with cables 1 of the third embodiment of the present invention will be described by referring to FIGS. 1, 5, 6, and 7. FIG. 5 is a perspective view showing configurations of the fluorescent tube with cables 1 according to the third embodiment of the present invention. FIG. 6 is a cross-sectional view showing configurations of a fluorescent tube 2 of the third embodiment of the present invention. FIG. 7 is a diagram illustrating cables 3a, 3b to be connected to the fluorescent tube 2 of FIG. 6.

The fluorescent tube with cables 1 of the third embodiment is fabricated by using the method for attaching the cable 3a or 3b to the fluorescent tube 2 of the first embodiment. As shown in FIGS. 1, 5, 6, and 7, the fluorescent tube with cables 1 includes the fluorescent tube 2 made up of the glass tube 7, a pair of electrodes 8a and 8b, each being sealed in each of ends of the glass tube 7 and a pair of lead conductors 9a and 9b each being exposed outside the glass tube 7 and being connected, respectively, to the electrodes 8a and 8b, and power-supplying cables 3a and 3b. A core wire 11a of the cable 3a is electrically connected to the lead conductor 9a and a core wire 11b of the cable 3b is electrically connected to the lead conductor 9b and their connected portion 21a is sealed with an insulating melt resin.

Thus, according to the third embodiment, as in the first embodiment, space is not required redundantly at the connected portion 21a and, therefore, in a surface illuminating device and/or a liquid crystal display device using the fluorescent tube with cables 1 of the third embodiment, it is possible to make small a width of a plaque edge portion 48a (see FIGS. 23 and 24).

Moreover, according to the third embodiment, at the connected portion 21a where the fluorescent tube 2 is connected to the cable 3a, after the lead conductor 9a of the fluorescent tube 2 has been electrically connected to the core wire 11a of the cable 3a, the connected portion 21a is molded with the resin and therefore the mechanical strength of the connected portion is enhanced and reliability of the connection between the fluorescent tube 2 and the cable 3a can be improved.

Examples

Figure 8:
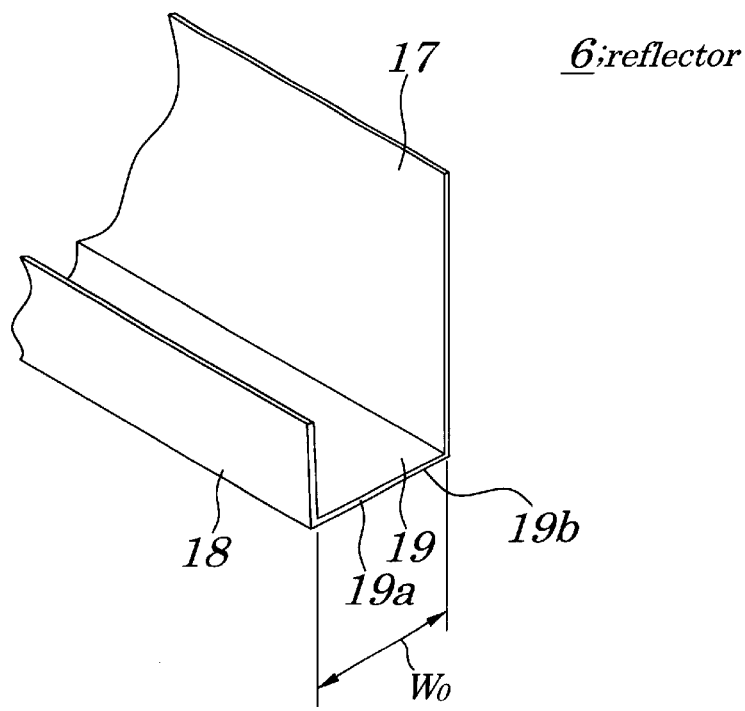
FIG. 8 is a partly enlarged perspective view showing configurations of a reflector to be attached to a fluorescent tube with cables according to the example of the present invention.
Figure 9:
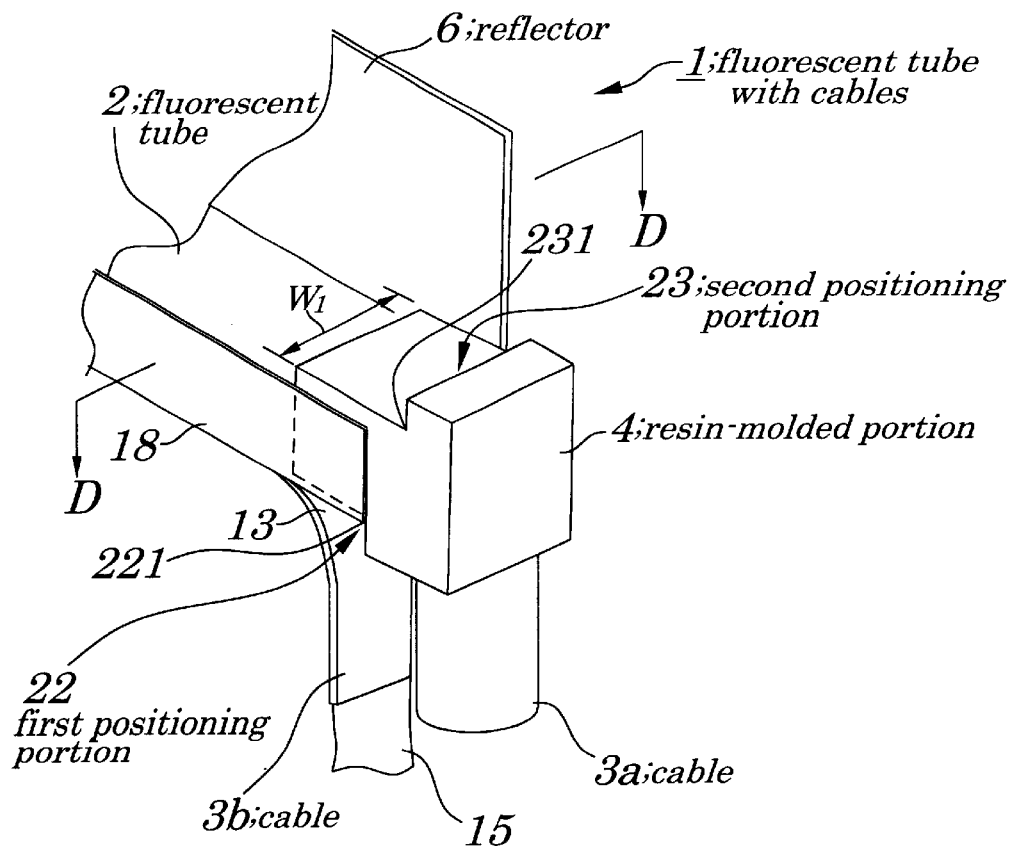
FIG. 9 is an enlarged perspective view of an "A" portion in FIG. 5 showing configurations of a resin-molded portion of the fluorescent tube with cables.
Figure 10:
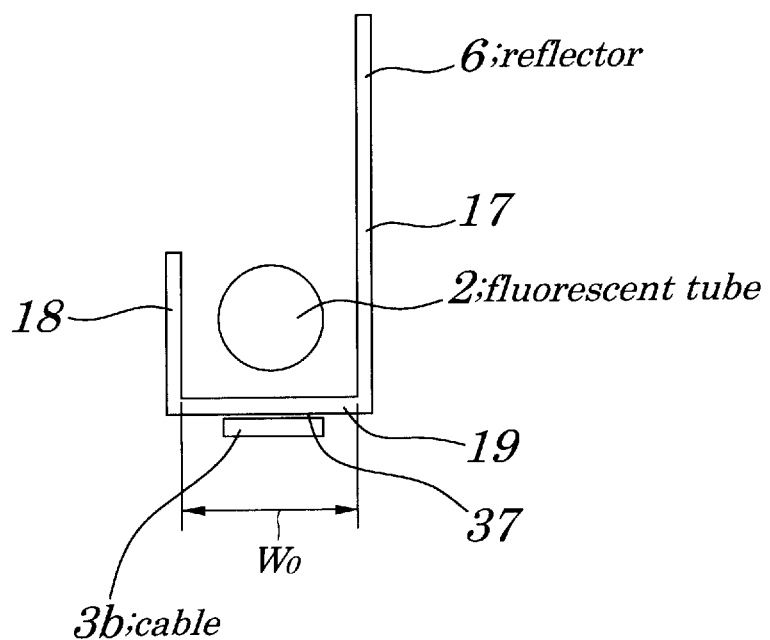
FIG. 10 is a cross-sectional view of the resin-molded portion of the fluorescent tube with cables of FIG. 9 taken along a line D—D.
Figure 11:
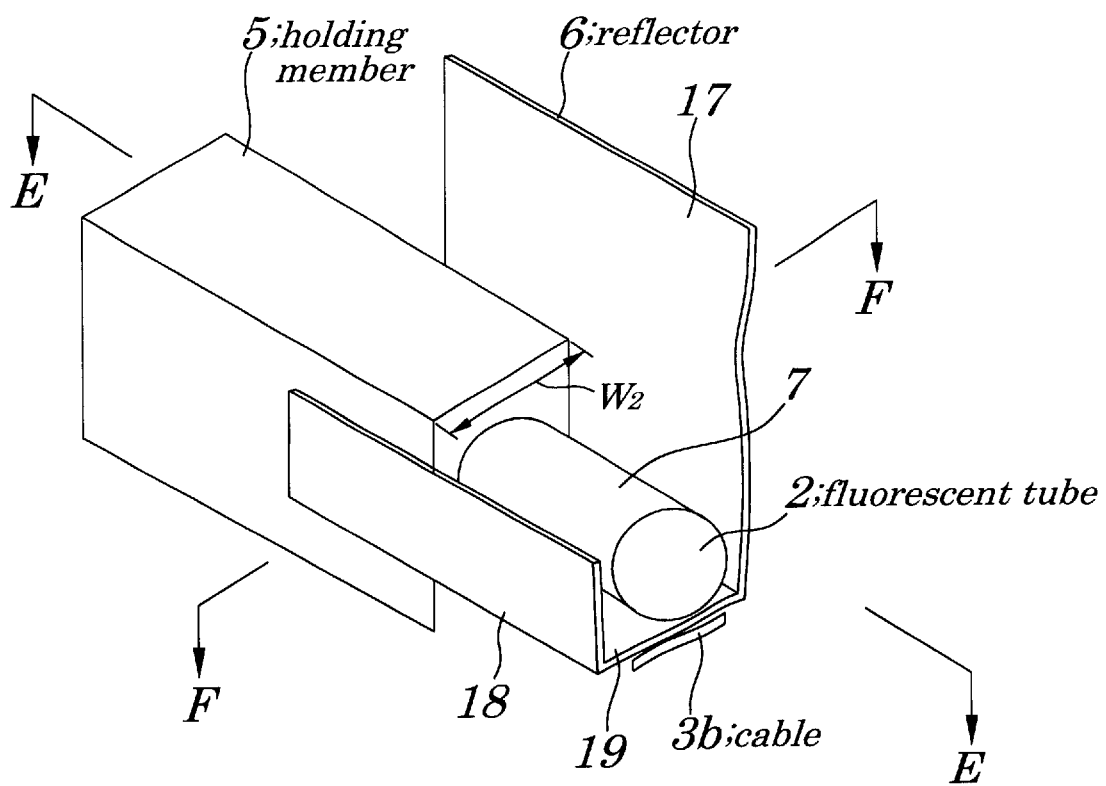
FIG. 11 is an enlarged perspective view of a "B" portion in FIG. 5.
Figure 12:
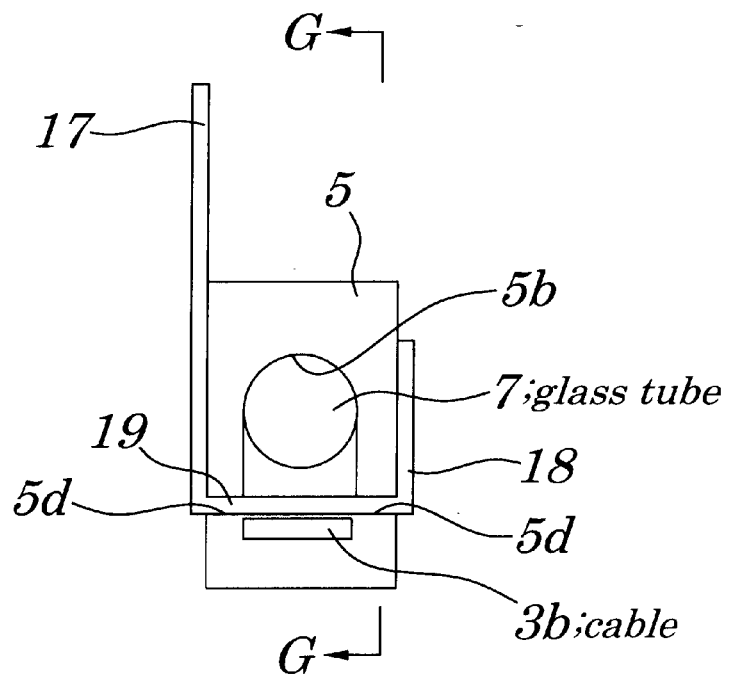
FIG. 12 is a cross-sectional view of the resin-molded portion of the fluorescent tube with cables of FIG. 11 taken along a line F—F.
Figure 13:
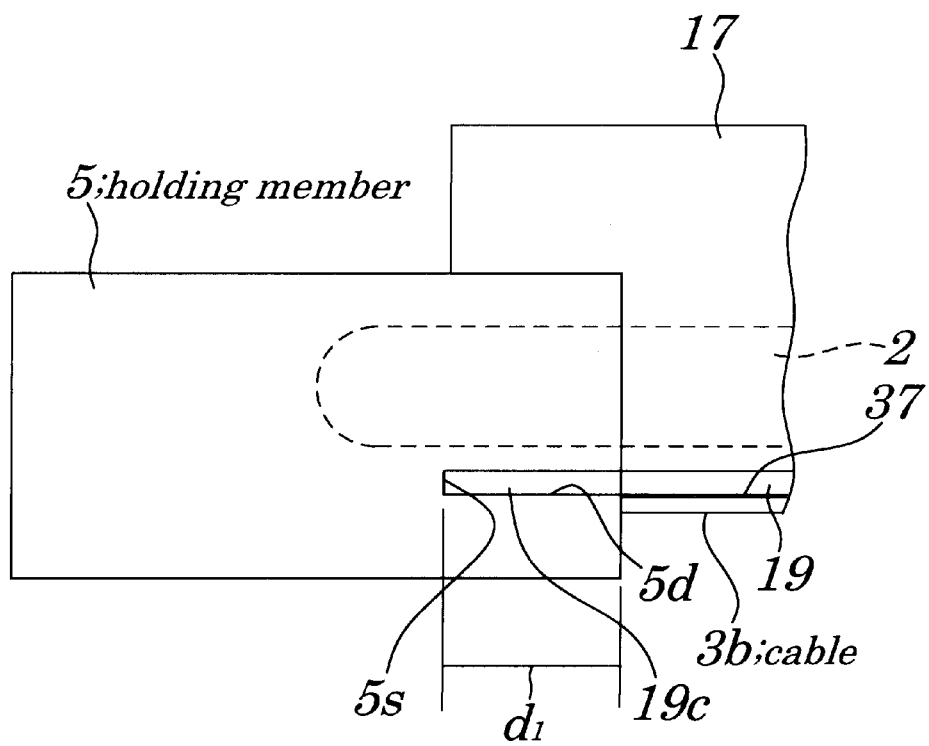
FIG. 13 is a cross-sectional view of the resin-molded portion of the fluorescent tube with cables of FIG. 12 taken along a line G—G.
Figure 14A:
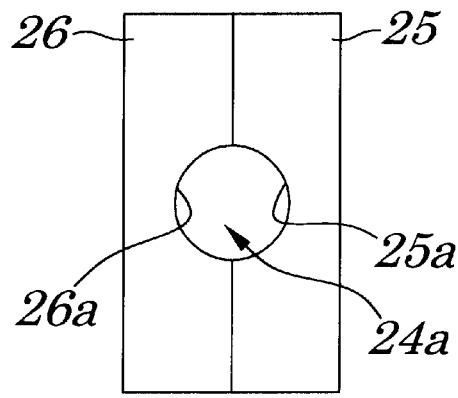
FIG. 14A is a diagram of a metal mold used for formation of a resin-molded portion obtained when viewed from a side on which the metal mold is positioned facing an end of the fluorescent tube.
Figure 14B:
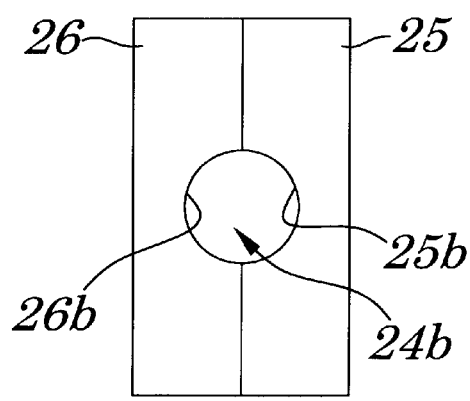
FIG. 14B is a diagram of the metal mold obtained when viewed from a side on which the metal mold is positioned facing an end of the cable.
Figure 14C:
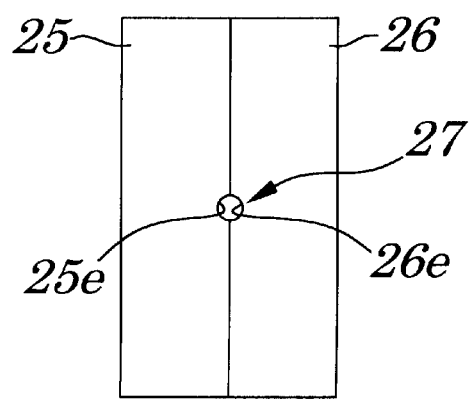
FIG. 14C is a diagram of the metal mold obtained when viewed from a side on which the metal mold is positioned facing an injection molding machine used for formation of the resin-molded portion according to the example of the present invention.
Figure 15A:
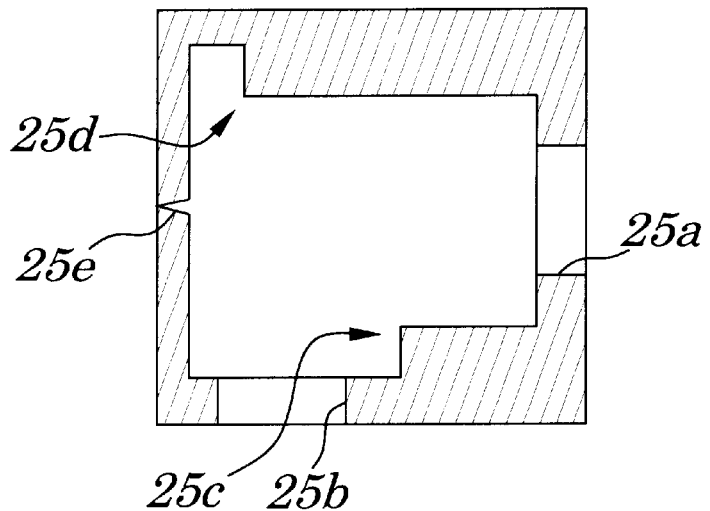
FIG. 15A is a cross-sectional view showing configurations of a surface mold of the metal mold and FIG. 15B is a cross-sectional view showing configurations of a rear mold of the metal mold of FIGS. 14A, 14B, and 14C.
Figure 15B:
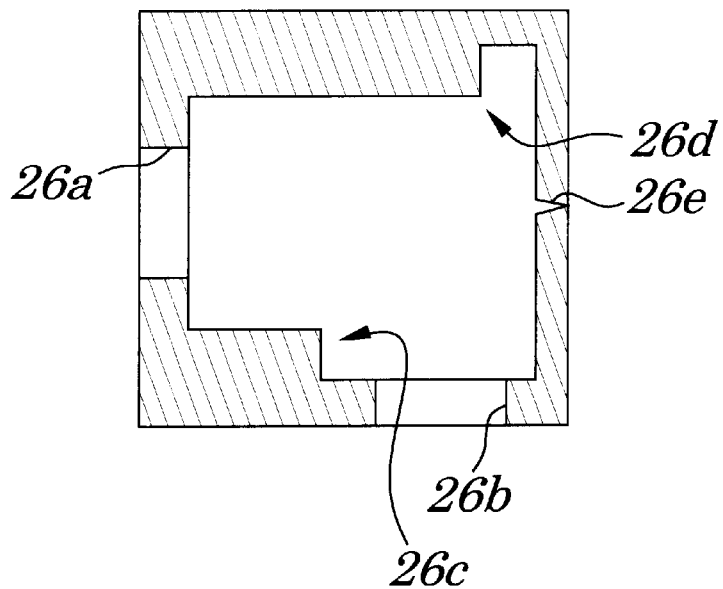
Figure 16:
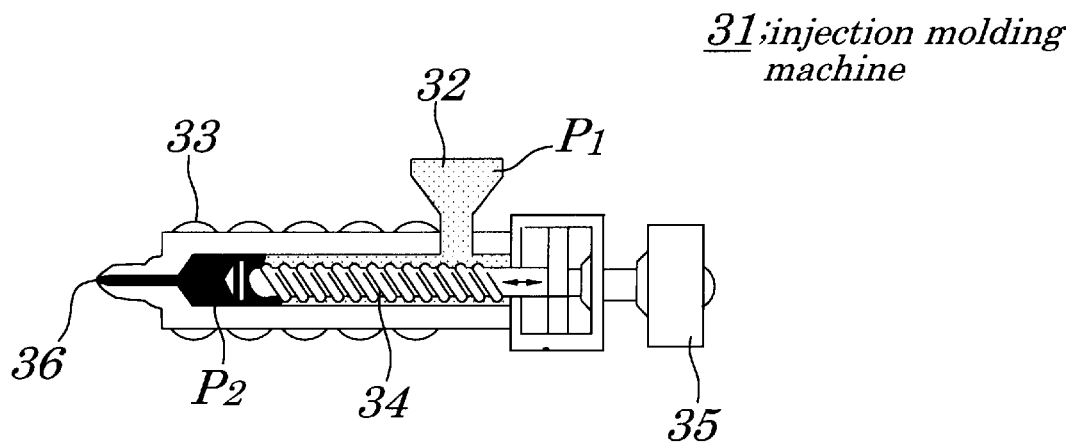
FIG. 16 is a diagram illustrating the injection molding machine of FIG. 14C.
Figure 17:
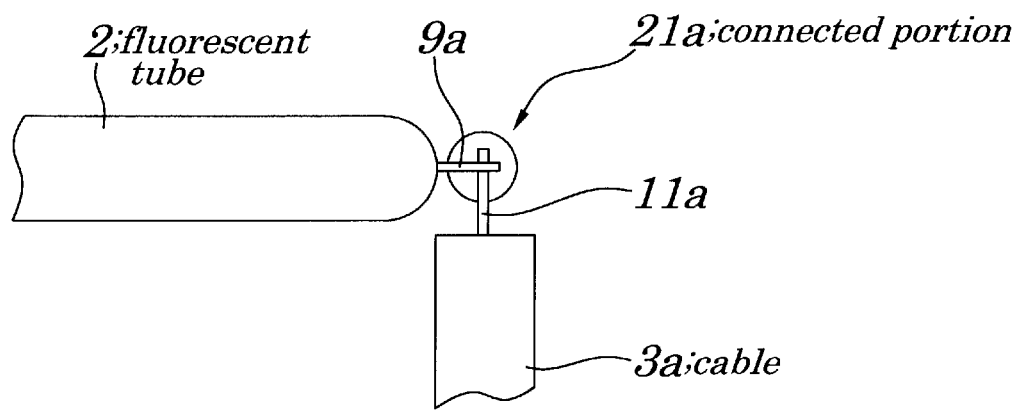
FIG. 17 is a diagram explaining a method for attaching a cable to a fluorescent tube according to the example of the present invention.
Figure 18A:
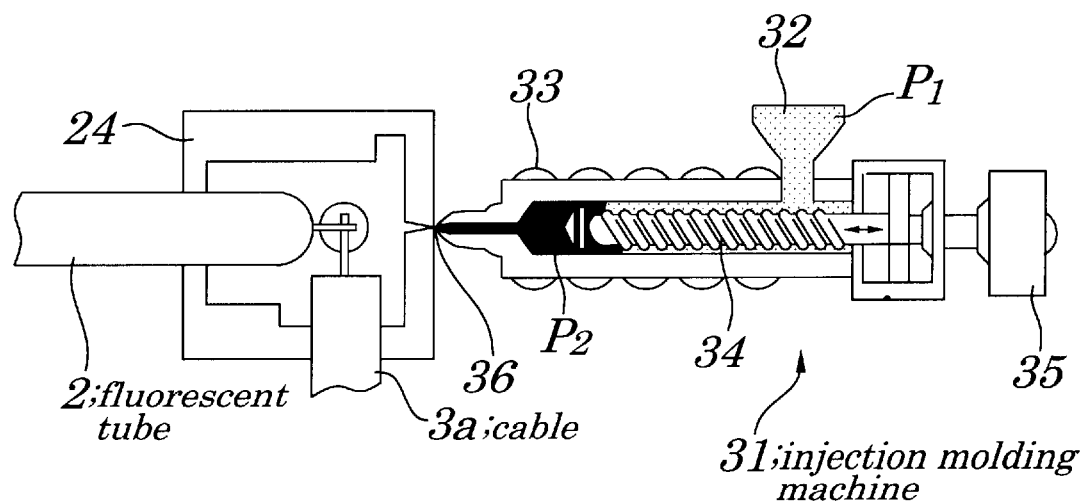
FIGS. 18A, 18B, and 18C are diagrams explaining the method for attaching the cable to the fluorescent tube according to the example of the present invention.
Figure 18B:
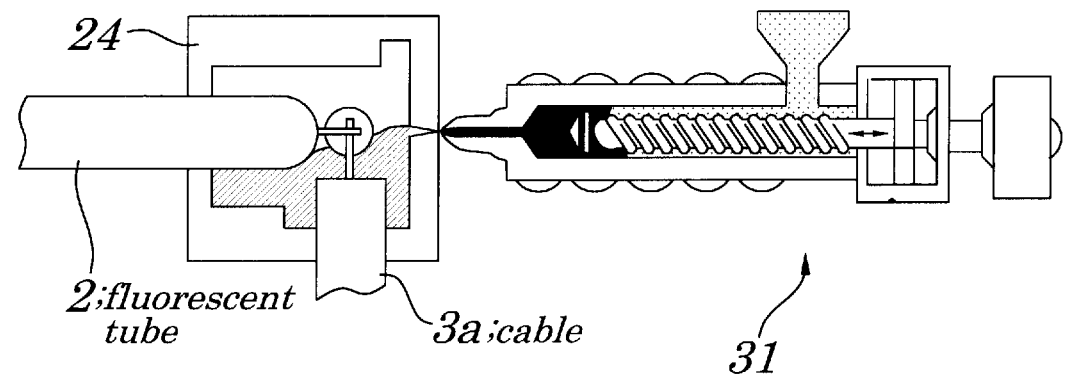
Figure 18C:
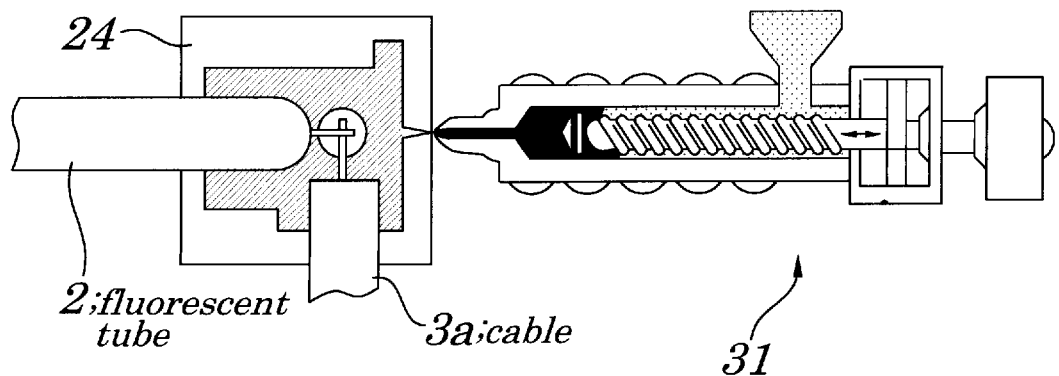
Figure 19:
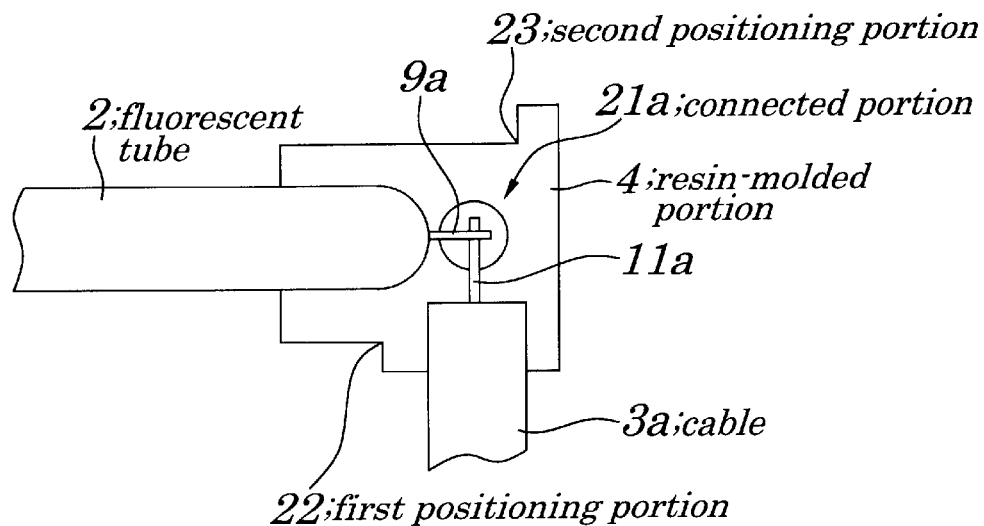
FIG. 19 is a diagram explaining the method for attaching the cable to the fluorescent tube according to the example of the present invention.
Figure 20:
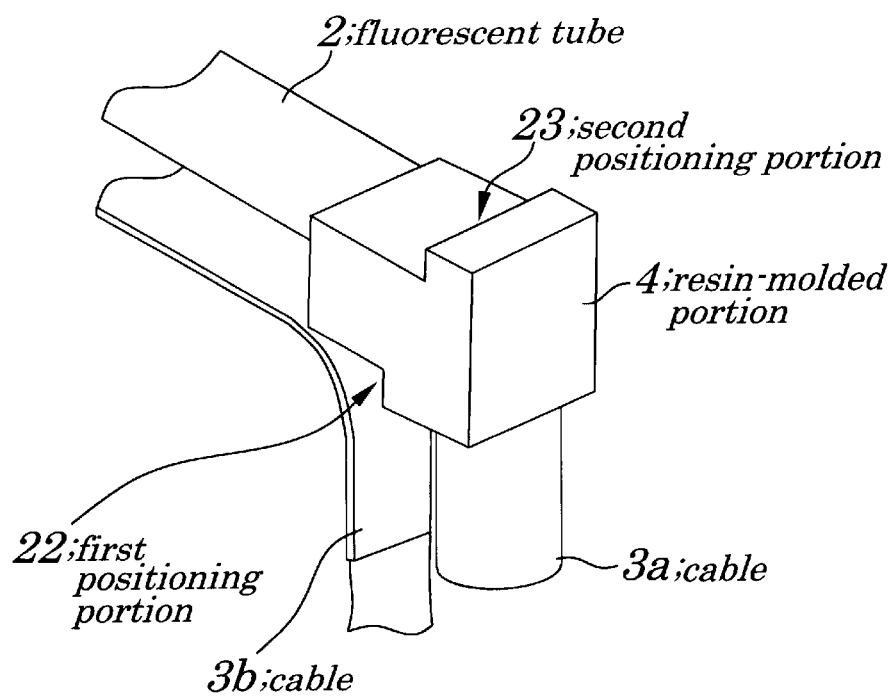
FIG. 20 is an exploded perspective view showing configurations of a backlight using the fluorescent tube with cables according to the example of the present invention.
Figure 21:
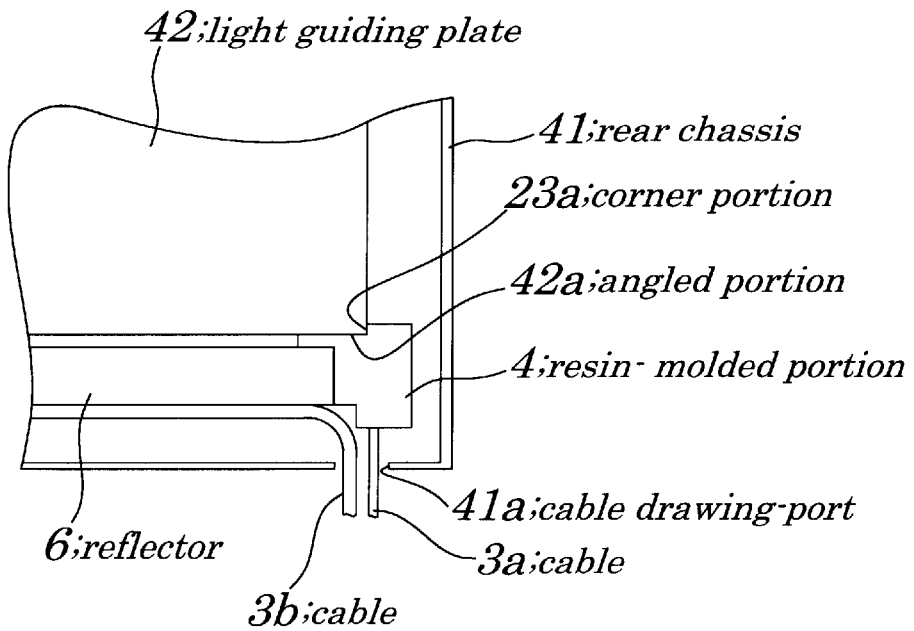
FIG. 21 is a diagram explaining a method for manufacturing the backlight according to the example of the present invention.
Figure 22:
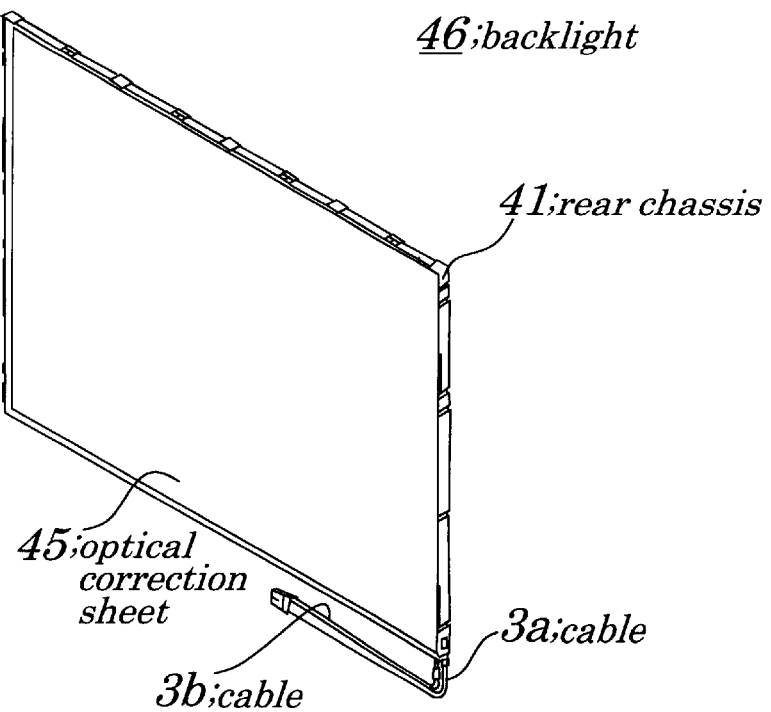
FIG. 22 is a perspective view showing configurations of the backlight according to the example of the present invention.

A method for attaching a cable to a fluorescent tube, method for manufacturing a surface illuminating device, a fluorescent tube with cables, a surface illuminating device and a liquid crystal device according to examples of the present invention will be explained by referring to FIG. 5 to FIG. 24. In the description of the examples, same figures used in the first and second embodiment will be referred if necessary. Moreover, in figures used for the other embodiments, same reference numbers are assigned to parts or components having the same function as in the first and second embodiments. Contents of FIG. 5 to FIG. 7 are as described above. FIG. 8 is a partly enlarged perspective view showing configurations of a reflector 6 to be attached to a fluorescent tube with cables 1 according to examples of the present invention. FIG. 9 is an enlarged perspective view of an "A" portion in FIG. 5 showing configurations of resin-molded portion of the fluorescent tube with cables 1. FIG. 10 is a cross-sectional view of the resin- molded portion 4 of the fluorescent tube with cables 1 of FIG. 9 taken along a line D—D. FIG. 11 is an enlarged perspective view of a "B" portion in FIG. 5. FIG. 12 is a cross-sectional view of the resin-molded portion 4 of the fluorescent tube with cables 1 of FIG. 11 taken along a line F—F. FIG. 13 is a cross-sectional view of the resin-molded portion 4 of the fluorescent tube with cables 1 of FIG. 12 taken along a line G—G. FIG. 14A is a diagram of a metal mold 24 used for formation of the resin-molded portion 4 obtained when viewed from a side on which the metal mold 24 is placed facing an end of a fluorescent tube 2 and FIG. 14B is a diagram of the metal mold 24 obtained when viewed from a side on which the metal mold 24 is placed facing an end of a cable 3b and FIG. 14C is a diagram of the metal mold 24 obtained when viewed from a side on which the metal mold 24 is placed facing an injection molding machine 31 used for formation of the resin-molded portion 4 according to the examples of the present invention. FIG. 15A is a cross-sectional view showing configurations of a surface of the metal mold 24 and FIG. 15B is a cross-sectional view showing configurations of a rear face of the metal mold 24 of FIGS. 14A, 14B, and 14C. FIG. 16 is a diagram illustrating the injection molding machine 31 of FIG. 14C. FIG. 17 is a diagram explaining the method for attaching a cable 3a to the fluorescent tube 2 according to the examples of the present invention;

FIGS. 18A, 18B, and 18C are diagrams explaining the method for attaching the cable 3a to the fluorescent tube 2 according to the examples. FIG. 19 is also a diagram explaining the method for attaching the cable 3a to the fluorescent tube 12 according to the examples. FIG. 20 is an exploded perspective view showing configurations of a backlight 46 using the fluorescent tube with cables 1 according to the examples. FIG. 21 is a diagram explaining a method for manufacturing the backlight 46 according to the examples. FIG. 22 is a perspective view showing configurations of the backlight 46 according to the examples. FIG. 23 is an exploded perspective view showing configurations of a liquid crystal display device 51 using the backlight 46 according to the example. FIG. 24 is a perspective view of the liquid crystal display device 51 of FIG. 23.

The fluorescent tube with cables 1 of the examples is embedded in the backlight 46 of a transmissive-type liquid crystal display device 51 for use as shown in FIG. 23. As shown in FIGS. 5 and 6, the fluorescent tube with cables 1 has a straight-tube type fluorescent tube 2 and a pair of cables 3a and 3b used to supply power to the electrodes 8a and 8b each being connected to each of the ends of the fluorescent tube 2. Moreover, the resin-molded portion 4 is formed at a connected portion where one end of the fluorescent tube 2 is connected to the cable 3a and a holding member 5 made of rubber is attached to a connected portion where the other end of the fluorescent tube 2 is connected to the cable 3b. A reflector 6 is integrally attached which is used to reflect light emitted from the fluorescent tube 2 off an inner wall of the fluorescent tube 2 and to emit strong light in a specified direction. The fluorescent tube 2, as shown in FIG. 6, has a long and cylindrical glass tube 7 with its both ends being blocked so that its inside portion is filled with mercury gas and inert gas in a sealed manner, a pair of electrodes 8a and 8b each being sealed at each of ends of the glass tube 7, and an ultraviolet ray reflecting layer and a phosphor layer formed in an inside face of the glass tube 7. The electrodes 8a and 8b are connected to lead conductors (terminals) 9a and 9b respectively. In FIG. 6, an end portion 2a of the fluorescent tube 7 is disposed opposite to a cable drawing-port 41a (refer to FIG. 4 and FIG. 21) of the cables 3a and 3b when the fluorescent tube with cables 1 is embedded in a rear chassis 41 used as a holding frame on the rear side of the backlight 46.

The core wire 11a of the cable 3a, as shown in FIGS. 3, 5 and 7, is circular in cross section and is covered with a insulating member 12a and is connected to the end portion 2a of the fluorescent tube 2. The core wire 11b of the cable 3b is also covered with a insulating member 12b and is connected to an end portion 2b of the fluorescent tube 2. A flat portion 13 of the cable 3b and a round portion 14 being circular in cross section of the cable 3b are connected at a connecting portion 15. The flat portion 13 is attached to an outer wall of the reflector 6 through a double-faced tape 37 (refer to FIG. 10 to FIG. 13). The flat portion 13 of the cable 3b extends to the side of the end portion 2b of the fluorescent tube 2. Moreover, as shown in FIGS. 5 and 7, the cables 3a and 3b are put together at the end portion 2a (on a side being opposite to the cable drawing-port 41a shown in FIG. 4) of the fluorescent tube 2 and a connector 16 used to connect the cables 3a and 3b to the power source (not shown) is connected to an end of cables 3a and 3b put together.

The reflector 6, as shown in FIG. 8, is a long member being groove-shaped in cross section made up of a lower side reflecting plate 17 having a comparatively large width and forming its lower side portion (that is, on a side opposite to a light emitting side of the backlight 46) when the fluorescent tube with cables 1 is embedded in the rear chassis 41 used as the holding frame for the backlight 46, of an upper side reflecting plate 18 having a comparatively small width and forming its upper side portion (that is, on a light emitting side) when the fluorescent tube with cables 1 is embedded in the rear chassis 41, and of a side reflecting plate 19 used to connect the lower side reflecting plate 17 and the upper side reflecting plate 18.

The resin-molded portion 4, as shown in FIGS. 3, 4, 5, and 9, is formed at a connected portion 21a where an end portion on the side being opposite to the cable drawing-port 41a of the fluorescent tube 2 is connected to the cable 3a and is so formed that apportion in which the lead conductor 9a is connected to the core wire 11a of the cable 3a in a manner that the core wire 11a is disposed perpendicular to the lead conductor 9a, together with ends of the glass tube 7 and the cable 3a, is molded with the resin so as to have a predetermined shape.

Moreover, the resin-molded portion 4, as shown in FIGS. 3 and 9, is so formed that it is notched in a form of a step at two places of its rectangular body so as to be of a shape of a letter "T" in cross section, and has a positioning portion (first positioning portion) 22 used to position the resin-molded portion 4 to the reflector 6 and another positioning portion (second positioning portion) 23 used to position the resin-molded portion 4 to a light guiding plate 42 (serving as a light guiding portion) mounted to take in direct light from the fluorescent tube 2 or light reflected off the reflector 6 and to emit it as planar light.

In the first positioning portion 22, the fluorescent tube 2 is positioned to the reflector 6 by pushing an end of the reflectors to a step portion (first step portion) 221 and, in the second positioning portion 23, the fluorescent tube 2 is positioned to the light guiding plate 42 by pushing an end of the light guiding plate 42 to another step portion (second step portion) 231.

As shown in FIG. 3 and FIG. 8 to FIG. 10, the resin-molded portion 4 is so formed that its width "w1" is approximately equal to a width "w0" between internal walls of the lower reflecting plate 17 and the upper reflecting plate 18 of the reflector 6.

The resin-molded portion 4, as shown in FIG. 3 and FIG. 9, is also so formed that a contact face 22a of the first positioning portion 22 comes into contact with an end face 19a of a side reflecting plate 19 of the reflector 6 in a struck manner and that a part having a length "a1" extending from the contact face 22a to a center portion of the fluorescent tube 2 is fixed with it being fitted between the lower side reflecting plate 17 and the upper side reflecting plate 18. Here, as the resin to be used, a thermoplastic resin having heat-resistance (130° C. or more) and electrical insulating property is selected. It includes, for example, polycarbonate, polybutylene telephthalate, nylon, liquid crystal polymer, polyethylene terephtalate, polyphenyl sulfide, or a like.

The holding member 5, as shown in FIG. 2, FIG. 5, FIG. 11, FIG. 12, and FIG. 13, has a rectangular outside shape made up of a housing portion 5a, being semi-circular in cross section, to house and protect a part connected to the connected portion 21b used to connect the fluorescent tube 2 and its end portion 2b, where an end of the core wire 11b of the cable 3b is connected to the lead conductor 9b of the fluorescent tube 2 with the end of the core wire 11b being bent in a form of a letter "U", pressing portions 5b and 5c used to press and hold an end portion of the glass tube 7 and cable 3b and notched portions 5d and 5d being fitted in an end portion 19c of the side reflecting plate 19 of the reflector 6.

A width "w2" (refer to FIG. 11) of the holding member 5 is so set as to be approximately the same as the width "W0" between the internal walls of the lower side reflecting plate 17 and the upper side reflecting plate 18 of the reflector 6. The holding member 5, as shown in FIG. 13 to FIG. 16, is so constructed that a part corresponding to a depth "d1" of the notched portion 5d from a rear end of the notched portion 5d to a center place of the fluorescent tube 2 is fixed with it being fitted between the lower side reflecting plate 17 and the upper side reflecting plate 18.

In the embodiment, the resin-molded portion 4 is formed by an injection molding method using a predetermined metal mold 24 and an injection molding machine 31. The metal mold 24 used in the injection molding machine 31 will be described below.

As shown in FIGS. 14A to 14C, when the fluorescent tube with cables 1 is embedded in the rear chassis 41 used as the holding frame on the rear side of the backlight 46, the metal mold 24 is divided into two portions, one being a surface mold 25 forming a part which faces a surface side (light emitting side) of the resin-molded portion 4 and the other being a rear mold 26 forming a part which faces a rear side of the resin-molded portion 4, in a manner so as to be symmetric with respect with a mirror surface, each having a concave and convex shape corresponding to the resin-molded portion 4.

As shown in FIGS. 14C and 15A, the surface mold 25 is made up of a notched portion 25a being notched so as to be semi-circular in cross section and a radius of which is equal to that of the glass tube 7, a notched portion 25b being semi-circular in cross section and a radius of which is equal to that of a reinforced portion of the cable 3a, a concave and convex portion 25c forming a half of a surface part of the second positioning portion 22, a concave and convex portion 25d forming a half of a surface part of the second positioning portion 23 and a groove portion 25e being semi-conical in cross section which forms a half of a surface part of a gate 27 used to inject a resin material.

As shown in FIGS. 14C and 15B, the rear mold 26 is made up of a notched portion 26a being semi-circular in cross section and a radius of which is equal to that of the glass tube 7, a notched portion 26b being semi-circular in cross section and a radius of which is equal to that of a reinforced portion of the cable 3a, a concave and convex portion 26c forming a half of a rear part of the second positioning portion 22, a concave and convex portion 26d forming a half of a rear part of the second positioning portion 23 and a groove portion 26e being semi-conical in cross section which forms a half of a rear part of the gate 27.

In a state in which the surface mold 25 and the rear mold 26 are put together, the hollow 28 is formed therein, as shown in FIG. 1. And, for example as shown in FIGS. 14A, a tube supporting hole 24a is formed by putting together the notching portions 25a and 26a, whereby a part other than the end 2a of the fluorescent tube 2 is held outside the hollow 28.

At the same time, as shown in FIG. 14B, a cable supporting hole 24b is formed by putting together the notched portions 25b and 26b, whereby a part other than an end 3s of the cable 3a is held outside the hollow 28. Moreover, as shown in FIG. 14C, the gate 27 is formed by the groove portions 25e and 26e.

The injection molding machine 31 of the embodiment, as shown in FIG. 16, has a hopper 32 used to supply a material being an unmelted resin P1, a heater 33 used to heat and melt the unmelted resin P1 to produce a melted resin P2, a screw 34 used to feed, by its rotation movement, the unmelted resin P1 supplied from the hopper 32 from a place where the resin P1 is supplied to an end portion 36 of the injection molding machine 31 while the unmelted resin P1 is being mixed in the melted resin P2 to be melted and a motor 35 used to rotate the screw 34.

Next, the method for attaching cables 3a and 3b to the fluorescent tube 2 of the embodiment will be explained.

Fist, as shown in FIG. 17, the core wire 11a of the cable 3a is connected to the lead conductor 9a of the fluorescent tube 2 by soldering in a manner that the core wire 11a is positioned approximately perpendicular to the lead conductor 9a.

As shown in FIG. 1 and FIGS. 14A to 14C, end portions of the fluorescent tube 2 and cable 3a are pinched between the surface mold 25 and the rear mold 26 and the connected portion 21a in which the lead conductor 9a is connected to the cable 3a is housed in the hollow 28 of the metal mold 24 internally formed when the surface mold 25 and rear mold 26 are put together.

As shown in FIG. 14C and FIGS. 18A to 18C, the end portion 36 of the injection molding machine 31 is positioned to the gate 27 of the metal mold 24.

Next, as shown in FIG. 18B, the melted resin P2 is injected into the hollow 28 of the metal mold 24 by driving the injection molding machine 31. Then, as shown in FIG. 18C, after the hollow 28 has been filled with the melted resin P2, the injection is stopped and, after the metal mold 24 has been cooled, the metal mold 24 is disassembled and a molded portion is taken out.

As shown in FIGS. 19 and 20, the resin-molded portion 4 is formed which covers the connected portion 21a and has the positioning portions 22 and 23. Now, the process of attaching the cable 3a to the fluorescent tube 2 is completed. Moreover, the attachment of the cable 3a to the end portion 2b of the fluorescent tube 2 is carried out after the cable 3a is attached to the reflector 6 (described later).

Next, the fluorescent tube 2 having the resin-molded portion 4 covering the connected portion 21a in which the cable 3a is connected to the end portion 2a of the fluorescent tube 2 is connected to the reflector 6.

As shown in FIG. 9, in a state in which the cable 3b is separated from the reflector 6, the fluorescent tube 2 is inserted in a manner that the fluorescent tube 2 is put on the side reflecting plate 19 of the reflector 6 and then the resin-molded portion 4 is fitted gradually between the lower side reflecting plate 17 and the upper side reflecting plate 18, from the end face 19a of the side reflecting plate 19 of the reflector 6 to have the contact face 22a of the first positioning portion 22 come into contact with the end face 19a of the side reflecting plate 19 in a struck manner.

Next, as shown in FIG. 3, the flat portion 13 of the cable 3b is attached to a lower face 19b of the side reflecting plate 19 of the reflector 6 through a double-sided tape 37.

Then, as shown in FIG. 2, the end of the core wire 11b of the cable 3b is connected to the lead conductor 9b of the fluorescent tube 2 with the end of the core wire 11b being bent in a form of a letter "U". Next, as shown in FIG. 2 and FIGS. 11 to 12, the holding member 5 is inserted from the side of its end with its housing portion 5a facing the reflector 6. That is, the holding member 5 is inserted until an end of the side reflecting plate 19 comes into contact with its rear end 5s in a struck manner while the holding member 5 is being inserted toward the end portion 19c of the side reflecting plate 19 and, at the same time, the pressing portions 5b and 5c press tips of the glass tube 7 and the cable 3b. At this point, the connected portion 21b is housed in the housing portion 5a. Thus, as shown in FIG. 5, the fluorescent tube with cables 1 to which the reflector 6 is attached is obtained.

Next, a method for manufacturing the backlight 46 using the fluorescent tube with cables 1 will be described.

First, as shown in FIG. 4, a reflecting sheet 43 used to reflect light emitted from the fluorescent tube 2 to a side of the light guiding plate 42 is placed on the rear chassis 41 serving as a holding frame on the rear side and the fluorescent tube with cables 1 to which the reflector 6 is attached is placed on the reflecting sheet 43 with a lamp cover 44 being attached. Here, cables 3a and 3b have been drawn out from the cable drawing-port 41a mounted in the rear chassis 41.

Next, the light guiding plate 42 made up of acrylic, polycarbonate or a like used to take in direct light from the fluorescent tube 2 and light reflected off the reflector 6 and the reflecting sheet 43 and to emit it as planar light is placed on the reflecting sheet 43. As shown in FIG. 21, positioning of the light guiding plate 42 in a direction along an axis of the fluorescent tube 2 on a light emitting surface and in a direction perpendicular to an axial direction is performed by contact of an angled portion 42a with a corner portion 23a of the second positioning portion 23.

Next, as shown in FIG. 4, a plurality of pieces of optical correction sheets 45, 45, . . . such as a prism sheet, diffusion sheet or a like used to correct variations in luminance with high accuracy and to improve uniformity in luminance are placed on the light guiding plate 42. The backlight 46 thus obtained, as shown in FIGS. 4 and 22, includes the fluorescent tube with cables 1 to which the reflector 6 is attached, rear chassis 41, light guiding plate 42, reflecting sheet 43, lamp cover 44, and optical correction sheets 45, 45, . . . .

As shown in FIG. 23, the backlight 46 is attached to the transmissive liquid crystal panel 47 to apply illuminating light from a rear side. Moreover, a front case 48 used as a holding frame to hold the liquid crystal display device 51 is attached to the liquid crystal display device 51 from a front side. Thus, the liquid crystal display device 51 includes, as shown in FIG. 24, the backlight 46, liquid crystal panel 47 and front case 48. The front case 48 has a plaque edge portion 48a used to cover a region not contributing to the application of illuminating light. The liquid crystal panel 47 used here is, for example, a TFT-type panel including a TFT substrate (not shown) on which the TFTs are formed, an opposite substrate disposed in a fixed manner via a clearance of several μm opposite to the TFT substrate on which a coloring layer (color filter) is formed, a layer of liquid crystal with which the clearance portion is filled in a, sealed manner, a TFT substrate and a pair of deflection plates disposed outside the opposite substrate. Moreover, as shown in FIG. 23, to edge portions of the liquid crystal display device 51 are connected a TCP (Tape Carrier Package) 49a in which ICs for driving the liquid crystal are packaged and printed boards 49b.

Thus, according to the embodiment, since the thickness of the connected portion 21a is sufficient if it can provide predetermined mechanical strength required to protect the connected portion 21a from an external force when the resin-molded portion 4 is formed by molding the connected portion 21a using the resin, the space for the resin-molded portion 4 can be made smaller compared with the conventional case in which the margin portion is formed by routing the cable 3a and the cable clamp is used. For example, since it is not necessary to form a bump projection piece on the rear chassis 41 and to route the cable 3a unlike in the case of the conventional technology, if a diameter of the cable 3a is about 1.6 mm, a width of the plaque edge portion 48a can be reduced to about 4 mm. Since it is about 7 mm in the conventional case, the reduction of about 3 mm is made possible. Therefore, in the backlight 46 and liquid crystal display device 51 using the fluorescent tube with cables 1, it is possible to make the plaque edge portion 48a narrower.

Moreover, according to the embodiment, in the connected portion 21a, after the lead conductor 9a of the fluorescent tube 2 has been connected to the core wire 11a of the cable 3a by using the soldering method, the entire connected portion 21a is molded with the resin having insulating property and heat-resistance and therefore the mechanical strength in the connected portion 21a can be enhanced. As a result, even when the connected portion 21a is subjected to an external force such as a shock, since the occurrence of breaking of the core wire 11a can be prevented, the reliability of the fluorescent tube 2 can be improved.

Also, according to the examples, since holding units such as the thermal shrinkage tube, cable clamp, or a like are not required in the connected portion 21a, it is possible to reduce the component counts and number of processes in assembly work. Furthermore, time or labor to route the cable is not required and, since the fluorescent tube 2 is not fixed using the holding unit such as the cable clamp, replacement of the fluorescent tube 2 can be performed within a short time in a unit of the fluorescent tube with cables 1.

Moreover, as shown in FIG. 3, since the first positioning portion 22 is formed on the resin-molded portion 4, when the fluorescent tube with cables 1 is attached to the reflector 6, only by having the contact face 22a of the first positioning portion 22 come into contact with the end face 19a in a struck manner, not only the attachment of the fluorescent tube with cables 1 can be easily implemented, but also the reflector 6 can be disposed properly and exactly on a place predetermined relative to the fluorescent tube with cables 1. This prevents the reflector 6 from being attached in a place being deviated from its originally designed position and also prevents the direct light from the fluorescent tube 2 or the light reflected off the reflector 6 from being emitted in an unwanted direction and the luminance characteristics being degraded.

Furthermore, as shown in FIG. 21, since the second positioning portion 23 is attached to the resin-molded portion 4, when the light guiding plate 42 is mounted to the fluorescent tube with cables 1, only by having the angled portion 42a come into contact with the corner portion 23a in a struck manner, not only the attachment of the light guiding plate 42 can be easily implemented but also the light guiding plate 42 can be disposed properly and exactly on a place predetermined relative to the fluorescent tube with cables 1. This prevents the light guiding plate 42 from being attached in a place being deviated from its originally designed position and also prevents the direct light from the fluorescent tube 2 or the light reflected off the reflector 6 from being emitted in an unwanted direction and the luminance characteristics from being degraded.

Therefore, the exact and reliable positioning of the reflector 6 and the light guiding plate 42 to the fluorescent tube with cables 1 is made possible, thus enhancing the yield and improving the reliability.

Figure 25:
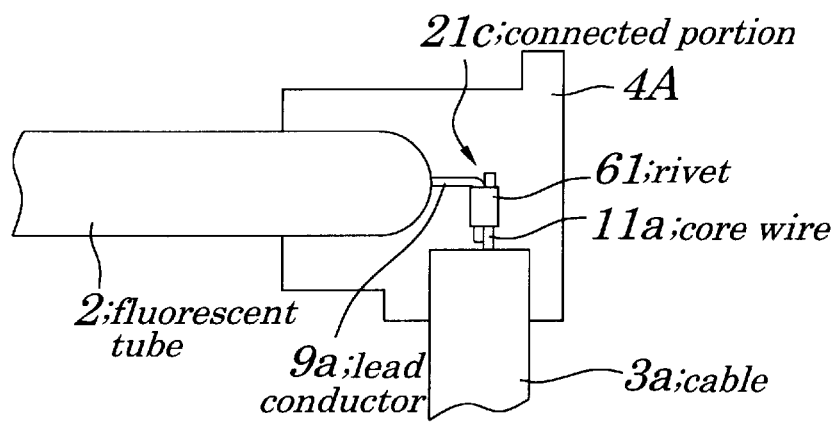
FIG. 25 is a diagram explaining a method of attaching a cable to the fluorescent tube according to a modified example of the present invention.

It is apparent that the present invention is not limited to the above embodiments but may be changed and modified without departing from the scope and spirit of the invention. For example, in the above embodiments and examples, after the core wire 11a of the cable 3a has been soldered to the lead conductor 9a of the fluorescent tube 2, the connected portion 21a is molded to form the resin-molded portion 4. However, as shown in FIG. 25, the resin-molded portion 4 may be formed by molding connected portion 21c after a rivet 61 has been attached to end portions of the lead conductor 9a and the core wire 11a and then the lead conductor 9a and core wire 11a have been connected by crimping. This enables work required to control a temperature of a soldering iron to become unnecessary.

Moreover, the resin-molded portion 4 may be formed not only by the injection molding but also by a cast-type molding method which can provide a low cost molding. In this case, not only the metal mold but also resin mold may be used.

Figure 26:
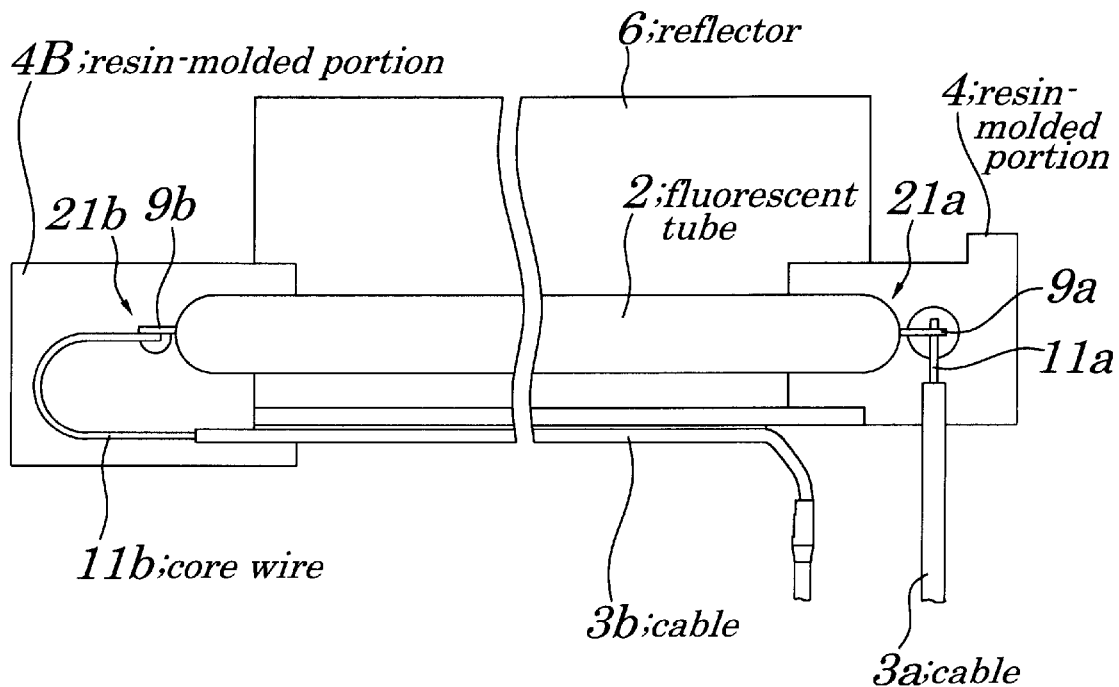
FIG. 26, is also a diagram explaining a method of attaching a cable to a fluorescent tube according to another modified example.

Also, as shown in FIG. 26, not only the connected portion 21a but also the connected portion 21b may be molded with resins to form a resin-molded portion 4B on the connected portion 21b. This enables the connected portion 21b to be reinforced more surely.

Figure 27:
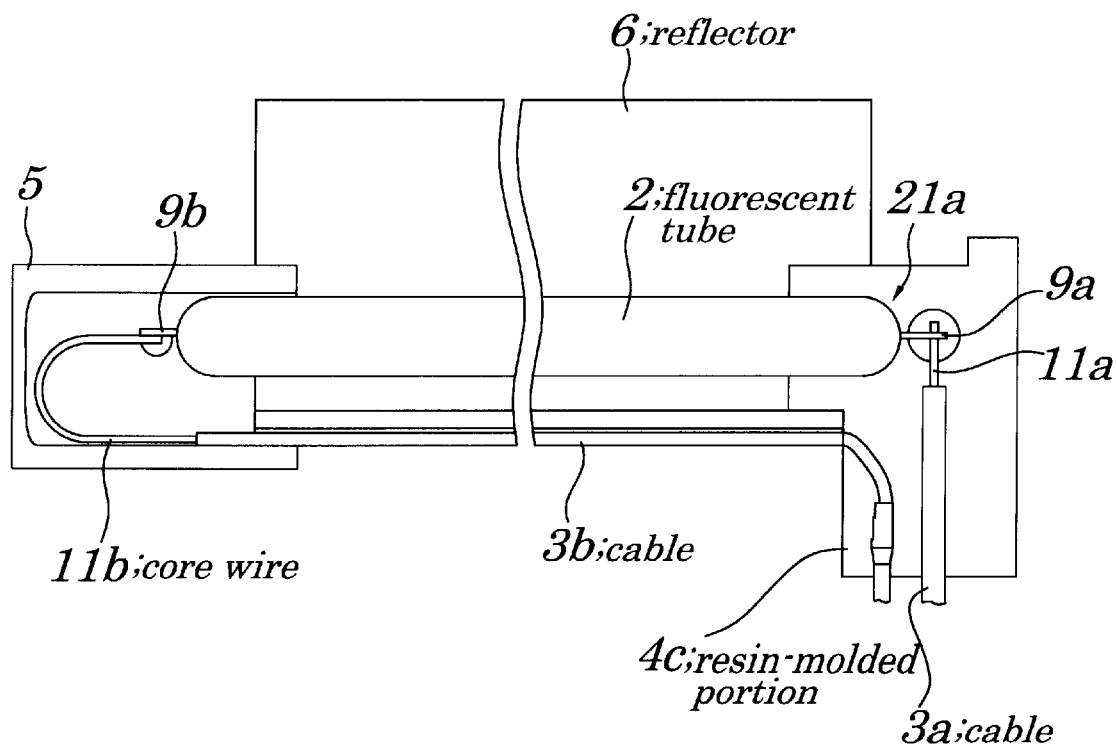
FIG. 27 is also a diagram explaining the method of attaching a cable to a fluorescent tube according to still another modified example.

Also, as shown in FIG. 27, a resin-molded portion 4C may be formed by putting the cables 3a and 3b together on a side being opposite to a cable drawing-port 41a (refer to FIG. 4) and by molding an entire portion including the cables 3a and 3b and the connected portion 21a. This enables both the cables 3a and 3b to be fixed firmly and can prevent the connected portions 21a and 21b from being subjected to a needless stress.

Figure 28:
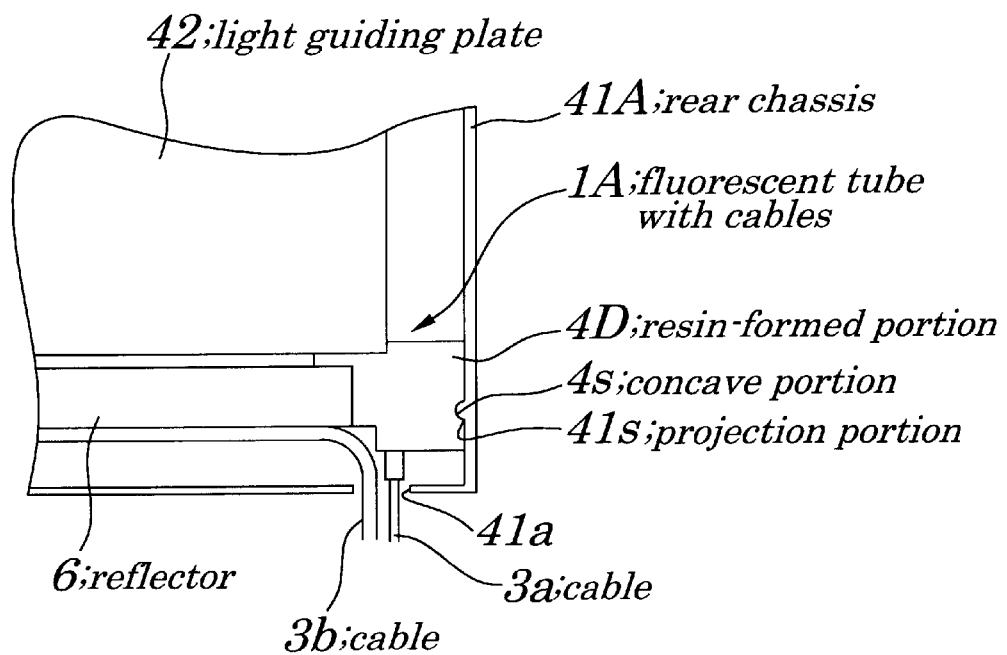
FIG. 28 is also a diagram explaining a method of attaching a cable to a fluorescent tube according to still another modified example.

Also, as shown in FIG. 28, a fluorescent tube with cables 1A may be positioned to a rear chassis 4 forming, for example, a projection portion 41s at a predetermined place inside the rear chassis 41A and also by forming a concave portion 4s that can be fitted in the projection portion 41s on a resin-molded portion 4D, thereby fitting the projection portion 41s into the concave portion 4s. This enables the fluorescent tube with cables 1A, reflector 6, and a light guiding plate 42 to be disposed more accurately.

Figure 29:
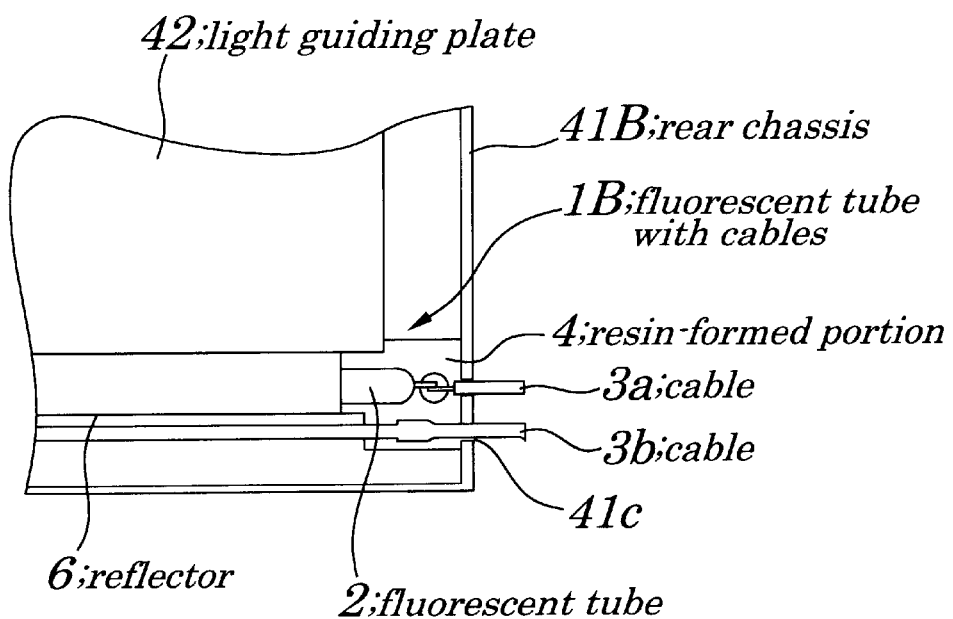
FIG. 29 is also a diagram explaining a method of attaching the cable to the fluorescent tube according to still another modified example.

Also, as shown in FIG. 29, the cables 3a and 3b may be drawn out from the cable drawing-port 41c (FIG. 4) of a rear chassis 41B in a horizontal direction along an axial direction of the fluorescent tube 2 by connecting the cable 3a in a straight line manner. By doing so, even when the liquid crystal display device using a fluorescent tube with cables 1B is used, for example, in a state being long in a longitudinal direction, a width of a plaque edge portion 48a can be made narrower (refer to FIG. 23).

Figure 30:
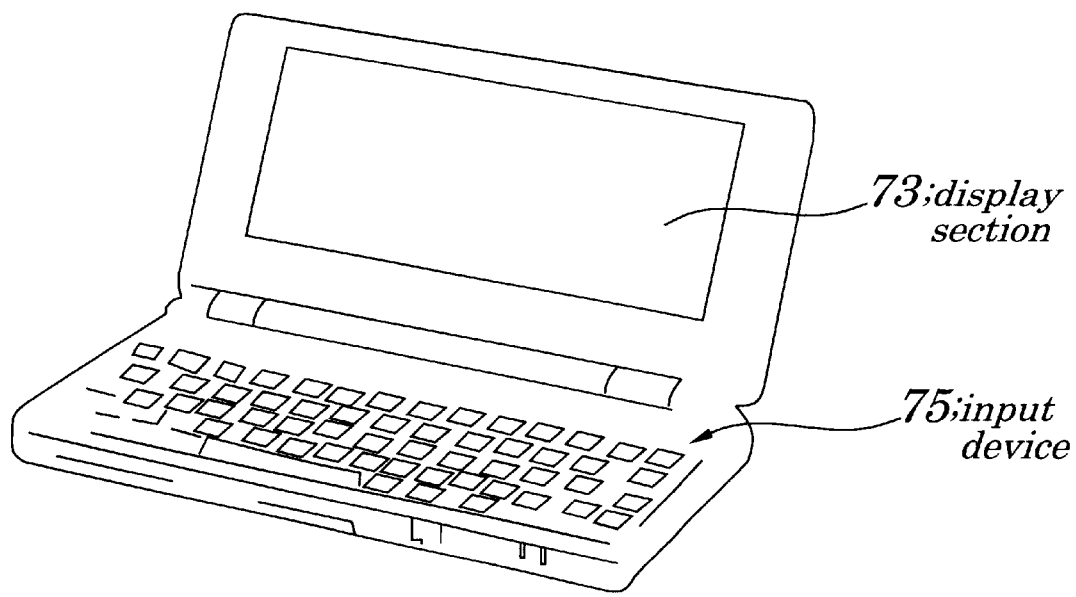
FIG. 30 is a perspective view showing configurations of a personal digital assistant using the liquid crystal display device of the present invention.
Figure 31:
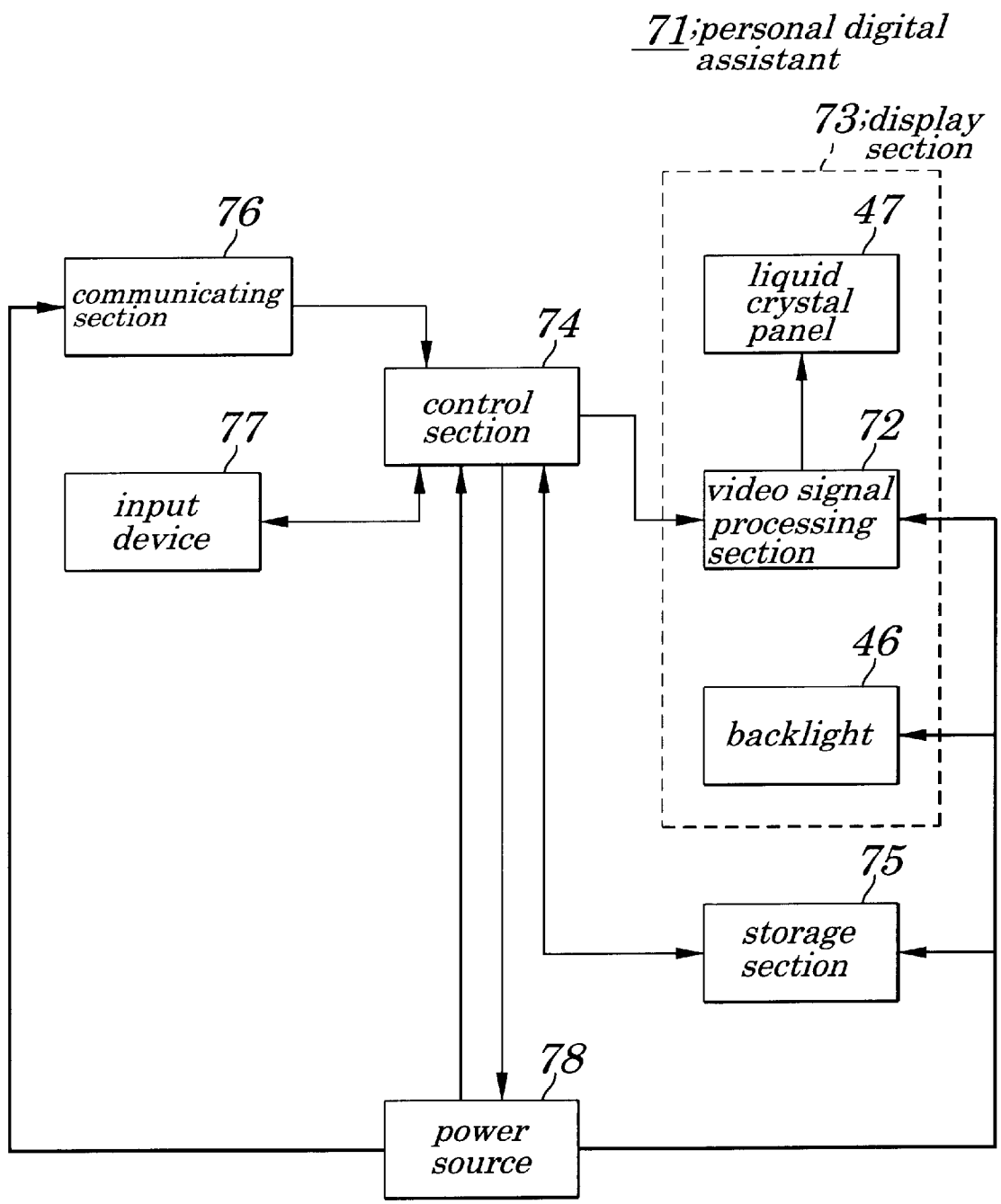
FIG. 31 is a schematic block diagram showing the configurations of the personal digital assistant of FIG. 30.

Moreover, as shown in FIGS. 30 and 31, a personal digital assistant (PDA) 71 can be constructed by using the backlight 46 manufactured according to the above embodiments. The PDA 71 includes a display section 73 having the liquid crystal panel 47 described above, a video signal processing section 72, and the backlight 46, a control section 74 used to control each of the components, a storage section 75 used to store processing programs executed by the control section 74 and/or various kinds of data, a communicating section 76 used to carry out data communications, an input device 77 having a keyboard, pointing device or a like, and a power source 78 used to supply power to each of the components.

Figure 32:
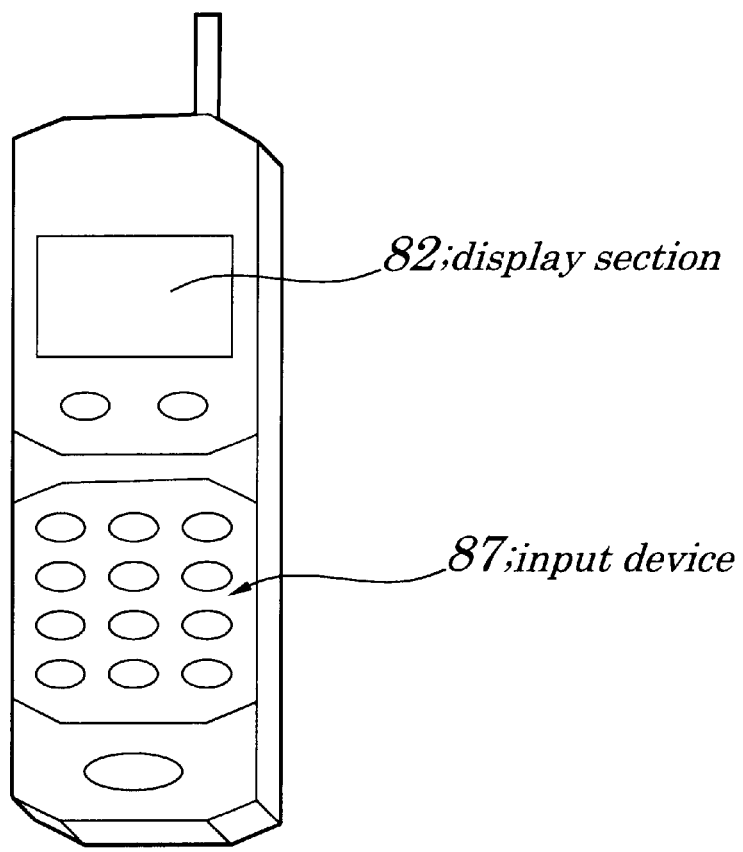
FIG. 32 is a perspective view showing configurations of a portable cellular phone using the liquid crystal display device of the present invention.
Figure 33:
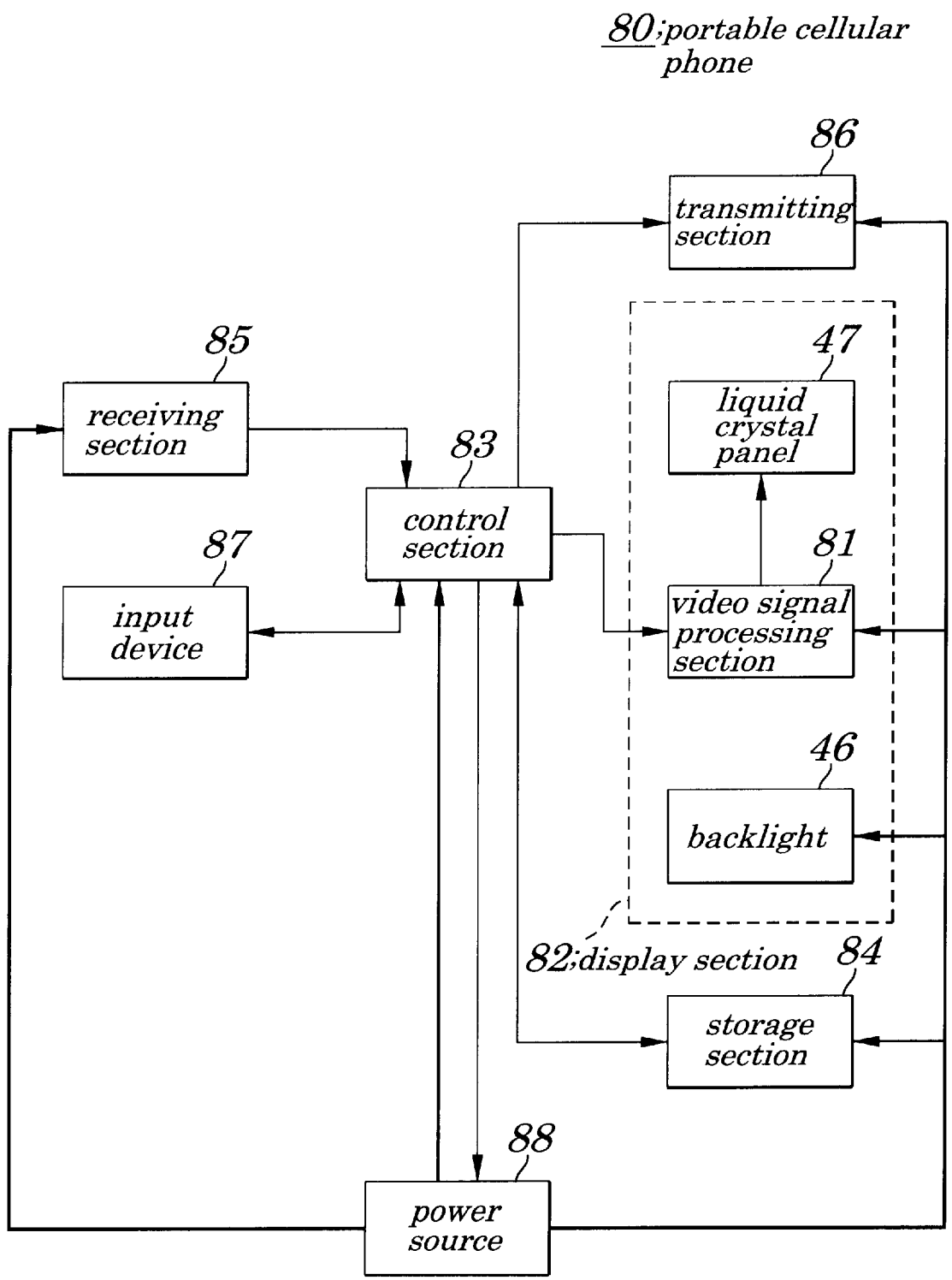
FIG. 33 is a schematic block diagram showing the configurations of the portable cellular phone of FIG. 32.
Figure 34:
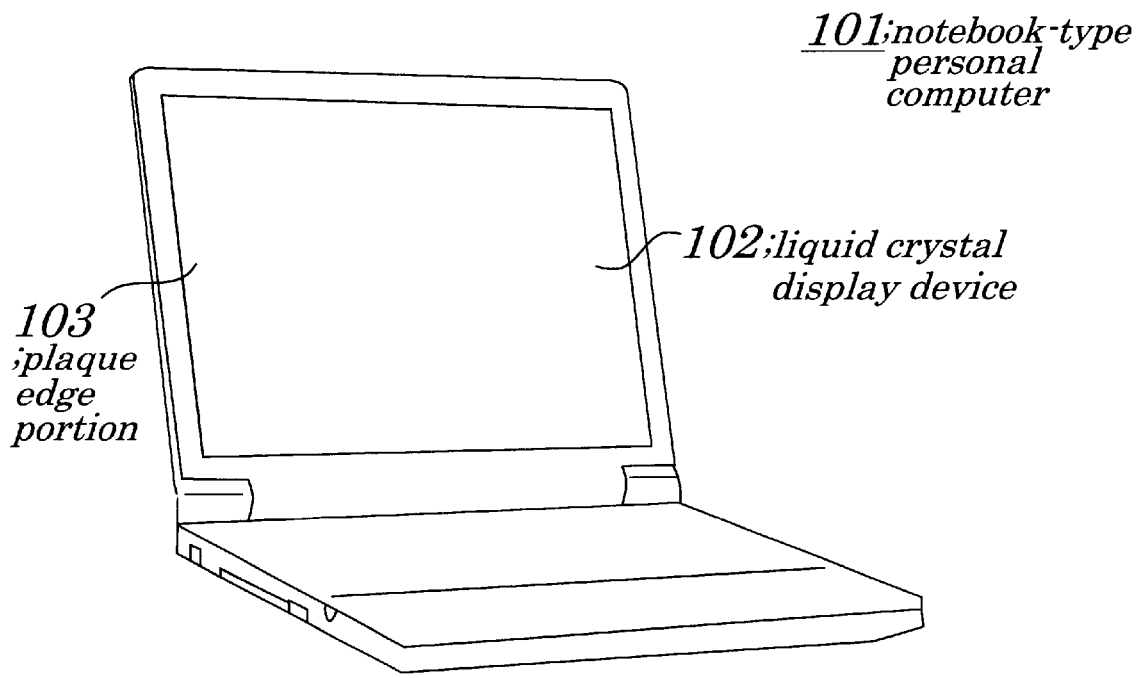
FIG. 34 is a diagram explaining conventional technology.
Figure 35:
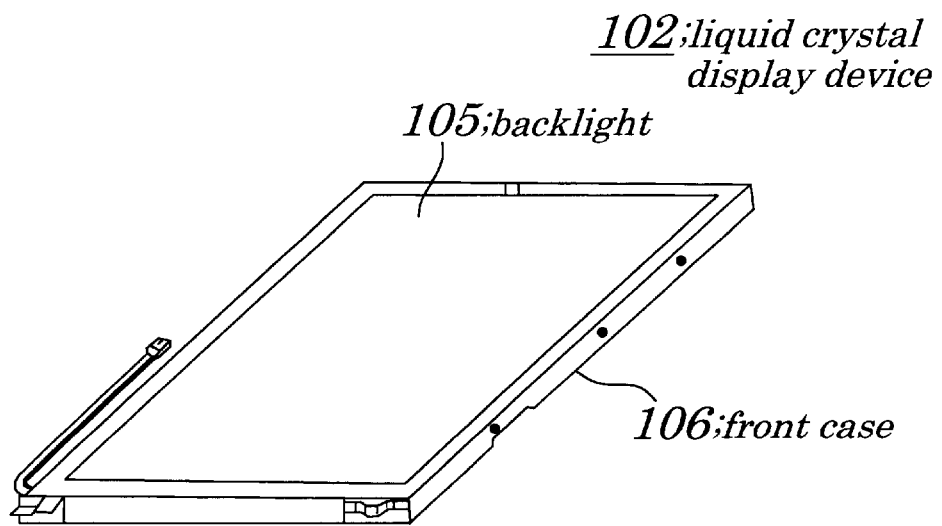
FIG. 35 is also a diagram explaining the conventional technology.
Figure 36:
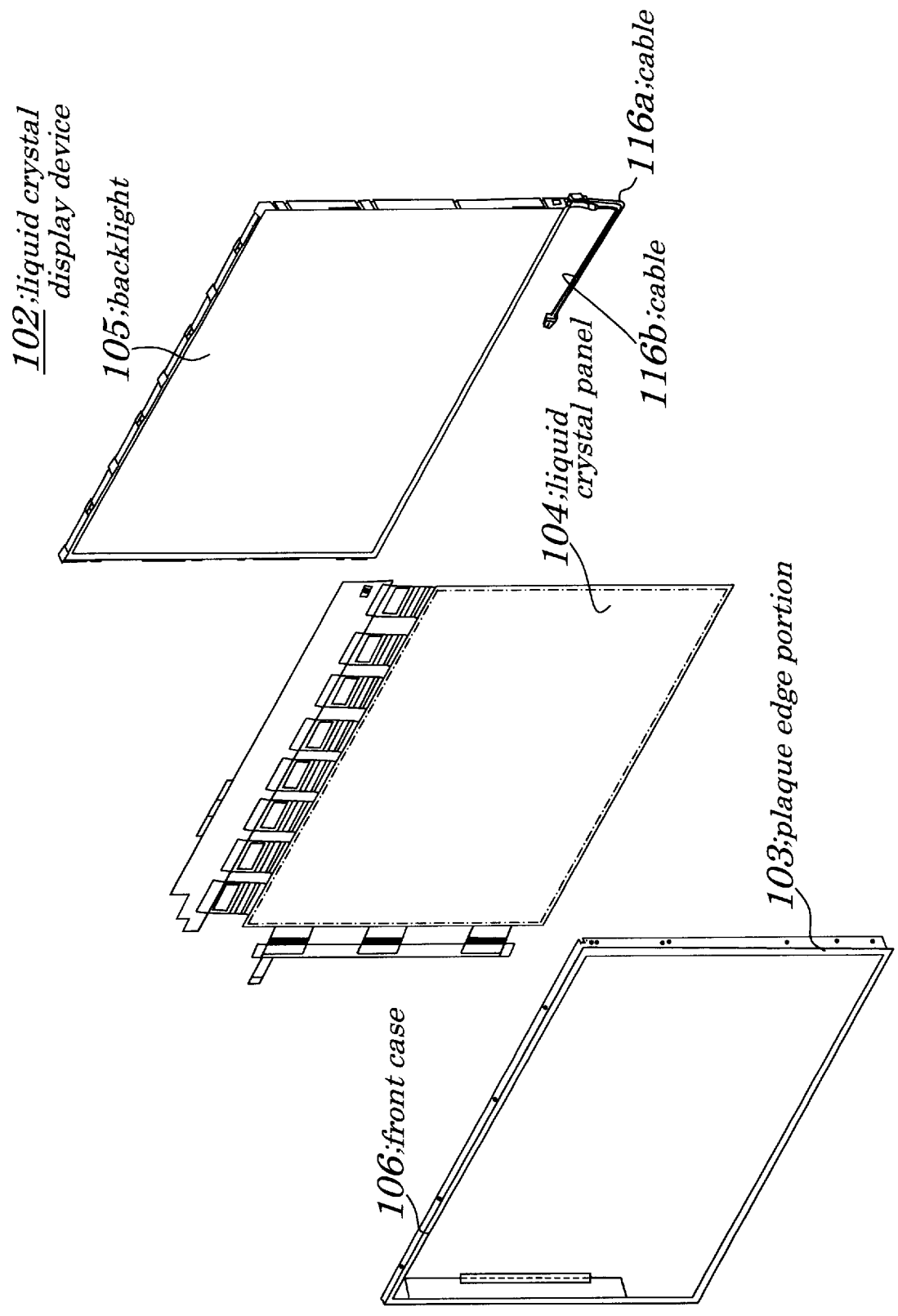
FIG. 36 is also a diagram explaining the conventional technology.
Figure 37:
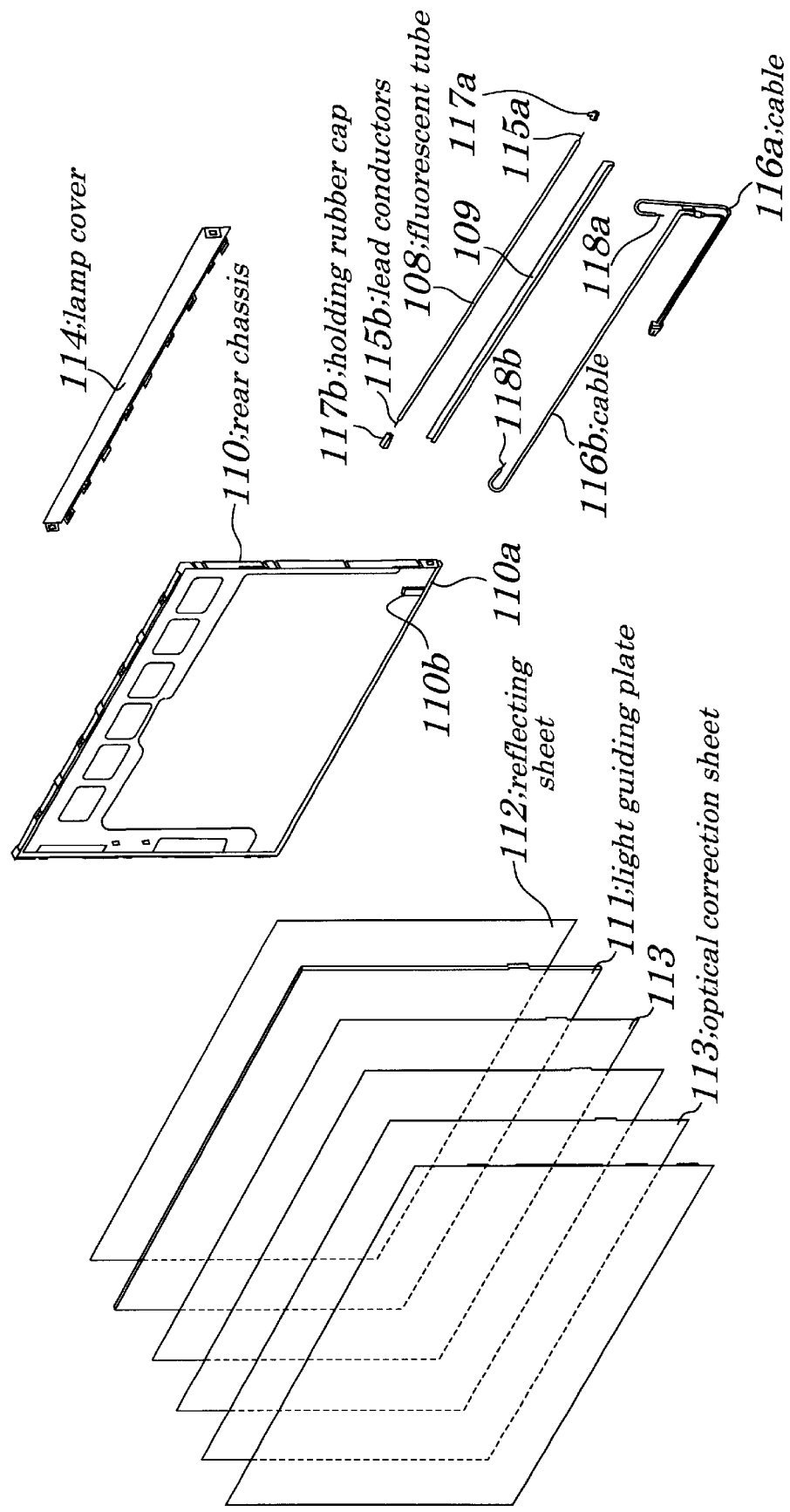
FIG. 37 is also a diagram explaining the conventional technology.
Figure 38:
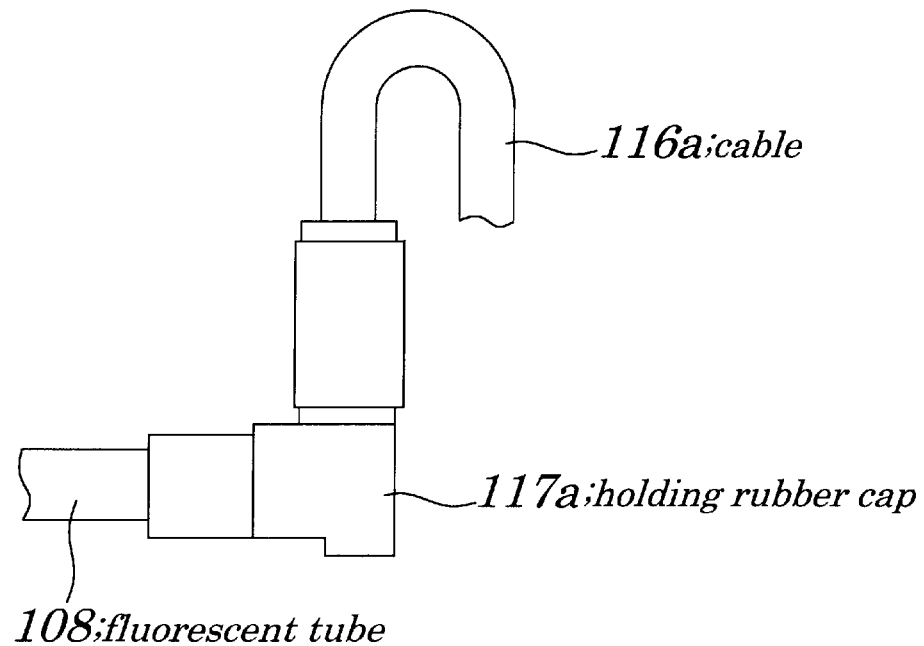
FIG. 38 is also a diagram explaining the conventional technology.
Figure 39:
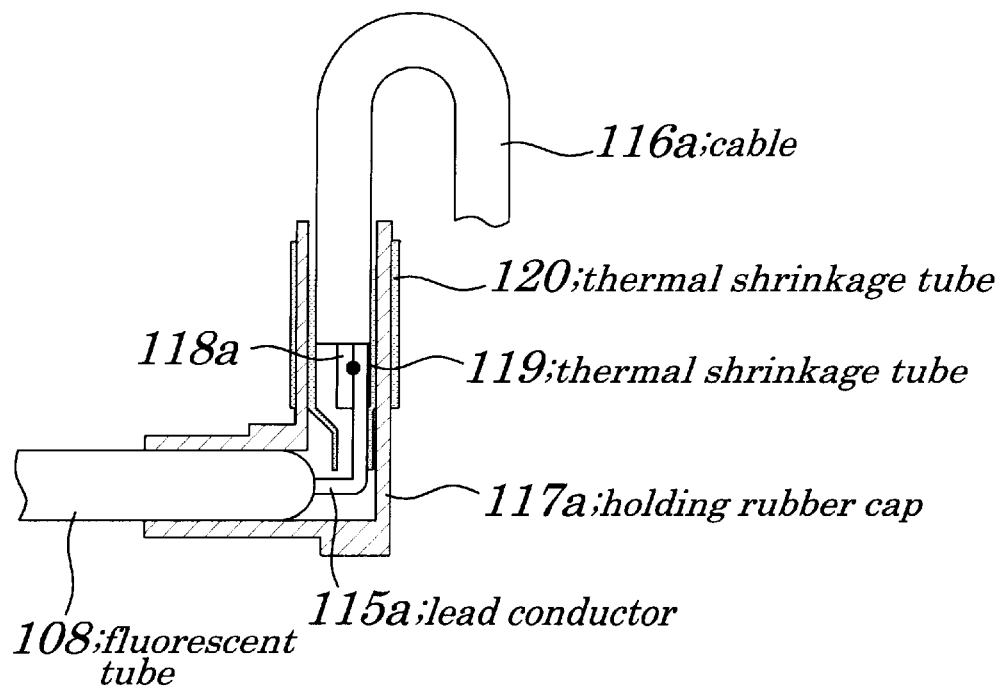
FIG. 39 is also a diagram explaining the conventional technology.
Figure 40:
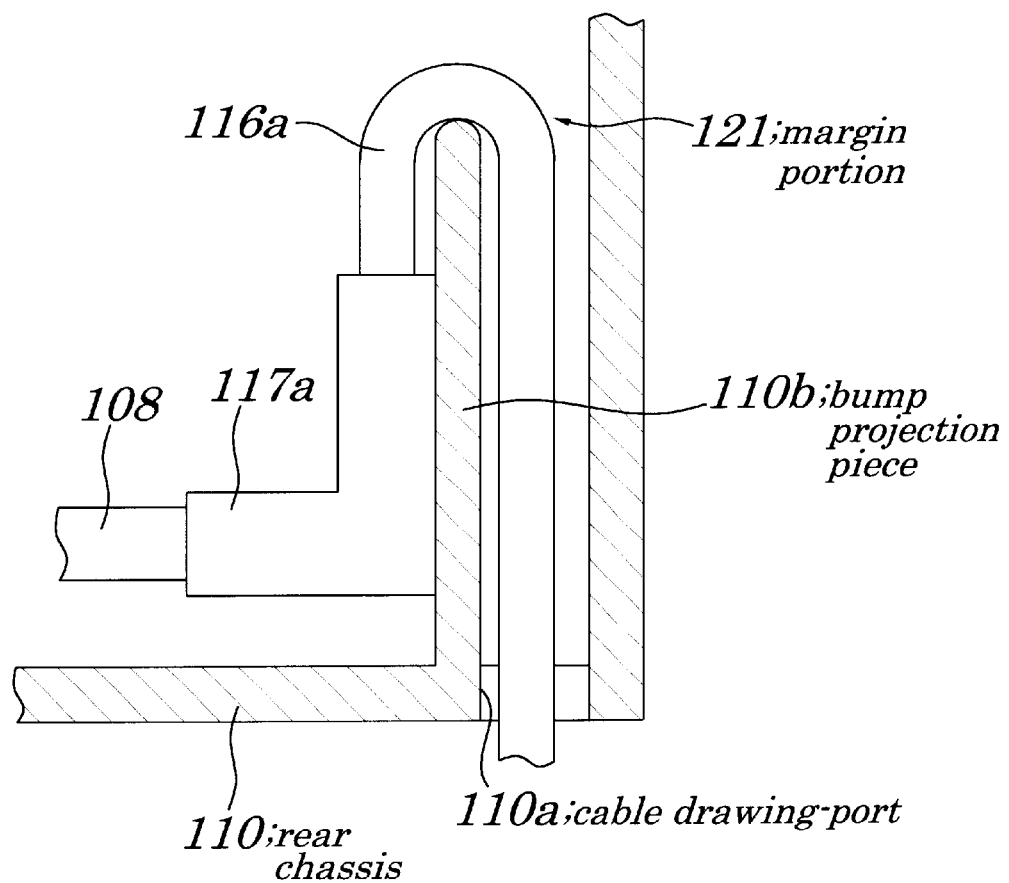
FIG. 40 is also a diagram explaining the conventional technology.
Figure 41:
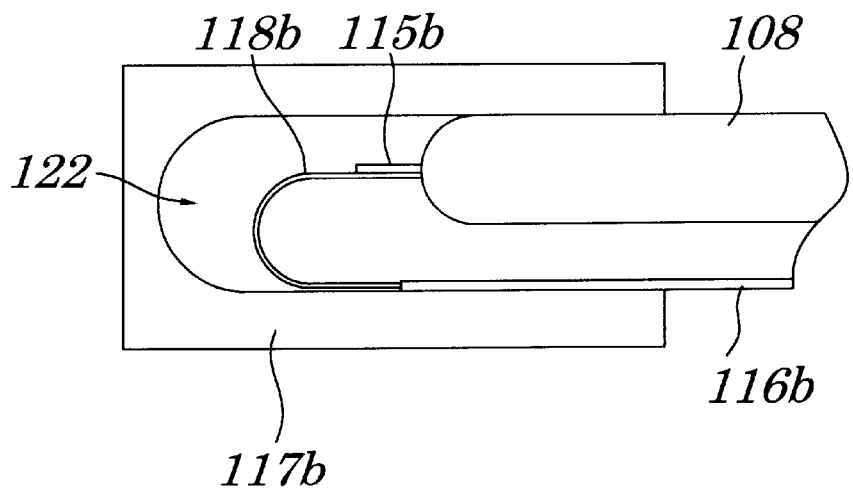
FIG. 41 is also a diagram explaining the conventional technology.

As described above, by using the fluorescent tube with cables 1, the plaque edge portion 48a (see FIG. 23) of the display section 73 is made narrower compared with that in the conventional technology. Therefore, the plaque edge portion 48a of the personal digital assistant 71 can be made narrower. The liquid crystal panel 47 and the backlight 46 using the methods of the present invention may be applied not only to the PDA but also to portable personal computers or notebook personal computers. Moreover, as shown in FIGS. 32 and 33, the backlight 46 of the present invention may be applied to a portable cellular phone 80. As shown in FIG. 33, the portable cellular phone 80 includes a display section 82 having the liquid crystal panel 47, a video signal processing section 81 and, the backlight 46, a control section 83, a storage section 84, a receiving section 85 used to receive radio signals and transmitting section 86 used to transmit radio signals, an input device 87 and a power source 88. Thus, the width of the plaque edge portion 48a of the portable cellular phone 80 having the components described above is made narrower compared with the conventional one.

Furthermore, in the above embodiments, the backlight 46 is applied to the transmissive-type liquid crystal display device 51, however, the surface illuminating device in which the fluorescent tube with cables 1 is embedded may be mounted as a front light of the reflective-type liquid crystal device.

It is apparent that the present invention is not limited to the above embodiments but may be changed and modified without departing from the scope and spirit of the invention.

What is claimed is:

1. A method for attaching a cable to a fluorescent tube in which said cable for supplying power is to be attached to said fluorescent tube being used as an illuminant for a liquid crystal display device and which has a glass tube and a pair of electrodes each of which is mounted and sealed in each end of said glass tube, said method comprising:

a step of electrically connecting a core wire of said cable to each of terminals being connected to said electrodes and being exposed outside said glass tube; and a step of housing a connected portion in which at least one of said terminals is connected to said core wire of said cable in a hollow inside a mold and then injecting a resin into said hollow and having said resin hardened in said hollow, thereby covering said connected portion with said molded resin.

2. The method for attaching the cable to the fluorescent tube according to claim 1, wherein said step of housing includes a step of housing at least one end portion of said glass tube and an end of an insulated portion of said cable on a side of said connected portion as well as said core wire in said hollow of said mold and then injecting said resin into said hollow and having said resin hardened to cover with said molded resin.

3. The method for attaching the cable to the fluorescent tube according to claim 1, wherein, as said resin to be used, a material having heat-resistance and electrical insulation is employed.

4. A method for manufacturing a surface illuminating device which is used as an illuminating device for a liquid crystal display device having as fluorescent tube made up of a glass tube and a pair of electrodes each of which is mounted and sealed in each end of said glass tube, a reflector used to reflect light emitted from said fluorescent tube and a light guiding section used to guide direct light from said fluorescent tube or light reflected off said reflector in a direction approximately perpendicular to a light emitting face of said surface illuminating device, said method comprising:

a step of electrically connecting a core wire of a cable for supplying power to said fluorescent tube to each of terminals being exposed outside said glass tube being connected to said electrodes of said fluorescent tube;

a step of housing a connected portion in which at least one of said terminals is connected to said core wire of said cable in a hollow of a mold in which a convex-shaped portion or a concave-shaped portion is formed and then injecting a resin in said hollow and having said resin hardened in said hollow to cover said connected portion with said molded resin and, at the same time, of forming a concave-shaped portion or convex-shaped portion corresponding to said concave-shaped portion or said convex-shaped portion and functioning as first and second positioning portions at predetermined places on said molded resin;

a step of attaching a reflector by having an end of said reflector come into contact with said first positioning portion, with said reflector being positioned to said fluorescent tube; and a step of attaching a light guiding section by having an angled portion come into contact with said second positioning portion, with said light guiding section being positioned to said fluorescent tube.

5. A fluorescent tube with cables to be used as an illuminant for a liquid crystal display device, comprising:

a glass tube;

a pair of electrodes each of which is sealed in each of ends of said glass tube;

a pair of terminals each being connected to each of said electrodes and being exposed outside said glass tube;

said cables for supplying power; and wherein a core wire of one of said cables is electrically connected to each of said terminals and at least one connected portion is sealed with a hardened insulating resin thereat, said core wire physically contacting said terminal, said hardened insulating resin physically contacting said core wire and said terminal at a location where said core wire physically contacts said terminal.

6. The fluorescent tube with cables according to claim 5, wherein a resin-molded portion is formed by covering at least one end portion of said glass tube and an end of an insulated portion of said cable on a side of said connected portion as well as said core wire with a molded resin.

7. A fluorescent tube with cables to be used as an illuminant for a liquid crystal display device, comprising:

a glass tube;

a pair of electrodes each of which is sealed in each of ends of said glass tube;

a pair of terminals each being connected to each of said electrodes and being exposed outside said glass tube;

said cables for supplying power; and wherein a core wire of said cable is electrically connected to each of said terminals and at least one connected portion is sealed with a hardened insulating resin thereat, and wherein said resin-molded portion includes a first positioning portion with which an end of a reflector used to reflect light emitted from said fluorescent tube is put in contact for positioning when said reflector is attached to said fluorescent tube with said cables and a second positioning portion with which an angled portion of a light guiding section used to guide light emitted from said fluorescent tube to a predetermined direction is put in contact for positioning when said light guiding section is attached to said fluorescent tube with said cables.

8. The fluorescent tube with cables according to claim 7, wherein said first positioning portion has a first step portion with which an end of said reflector is put in contact when said reflector is attached to said fluorescent tube with said cables and a second step portion with which an angled portion of said light guiding section is put in contact when said light guiding section is attached to said fluorescent tube with said cables.

9. A surface illuminating device to be used as an illuminating device for a liquid crystal device comprising:

a fluorescent tube with cables to be used as an illuminant, having: a glass tube, a pair of electrodes each of which is sealed in each of ends of said glass tube, a pair of terminals each being connected to each of said electrodes and being exposed outside said glass tube, and said cables for supplying power; and wherein a core wire of one of said cables is electrically connected to each of said terminals and at least one connected portion is sealed with a hardened insulating resin thereat, said core wire physically contacting said terminal, said hardened insulating resin physically contacting said core wire and said terminal, at a location where said core wire physically contacts said terminal;

a reflector used to reflect light emitted from said fluorescent tube; and a light guiding section used to guide direct light from said fluorescent tube or light reflected off said reflector to a direction approximately perpendicular to a light emitting face of said surface illuminating device.

10. A liquid crystal display device comprising:

the surface illuminating device stated in claim 9; and a liquid crystal panel.

* * * * *